United States Patent
Suzuki

(10) Patent No.: US 11,184,755 B2
(45) Date of Patent: Nov. 23, 2021

(54) COMMUNICATION APPARATUS, COMMUNICATION METHOD, AND PROGRAM

(71) Applicant: FeliCa Networks, Inc., Tokyo (JP)

(72) Inventor: Takashi Suzuki, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 0 days.

(21) Appl. No.: 16/614,053

(22) PCT Filed: May 8, 2018

(86) PCT No.: PCT/JP2018/017740
§ 371 (c)(1),
(2) Date: Nov. 15, 2019

(87) PCT Pub. No.: WO2018/216459
PCT Pub. Date: Nov. 29, 2018

(65) Prior Publication Data
US 2020/0178055 A1    Jun. 4, 2020

(30) Foreign Application Priority Data
May 22, 2017    (JP) .............................. JP2017-100858

(51) Int. Cl.
*H04W 4/80*      (2018.01)
*H04W 8/24*      (2009.01)
*H04W 88/06*     (2009.01)

(52) U.S. Cl.
CPC ............. *H04W 4/80* (2018.02); *H04W 8/245* (2013.01); *H04W 88/06* (2013.01)

(58) Field of Classification Search
CPC ........ H04W 4/80; H04W 8/245; H04W 88/06
(Continued)

(56) References Cited

U.S. PATENT DOCUMENTS

2006/0239236 A1   10/2006   Otsuka
2013/0029596 A1   1/2013    Preston et al.
(Continued)

FOREIGN PATENT DOCUMENTS

CN    103262644 A    8/2013
CN    103561480 A    2/2014
(Continued)

OTHER PUBLICATIONS

May 4, 2020, European Search Report issued for related EP application No. 18805060.3.

*Primary Examiner* — Lee Nguyen
(74) *Attorney, Agent, or Firm* — Paratus Law Group, PLLC

(57) ABSTRACT

There is provided a communication apparatus, a communication method, and a program that enable short-range wireless communication to be made speedily with various communication parties different in model and service. The communication apparatus includes: a first short-range wireless communication unit configured to communicate with a communication party, via first short-range wireless communication; an acquisition unit configured to acquire, prior to the communication via the first short-range wireless communication, identification information notified from the communication party, via second short-range wireless communication wider in communicable range than the first short-range wireless communication; and a control unit configured to control the first short-range wireless communication unit and the acquisition unit, in which the control unit acquires a parameter file corresponding to the identification information having been acquired, and sets, on the basis of the parameter file, a parameter for the first short-range wireless communication to the first short-range wireless communication unit.

16 Claims, 33 Drawing Sheets

(58) Field of Classification Search
USPC .............................................. 455/41.1–41.3
See application file for complete search history.

(56) References Cited

U.S. PATENT DOCUMENTS

| | | | |
|---|---|---|---|
| 2014/0375428 A1* | 12/2014 | Park | ........................ H04L 67/22 |
| | | | 340/10.1 |
| 2016/0227348 A1* | 8/2016 | Guo | .................... G06F 21/6218 |
| 2017/0123739 A1 | 5/2017 | Konji | |

FOREIGN PATENT DOCUMENTS

| CN | 103973340 A | 8/2014 |
|---|---|---|
| EP | 2846473 A1 | 3/2015 |
| JP | 2011-217043 A | 10/2011 |
| WO | WO 2013/089438 A1 | 6/2013 |
| WO | WO 2013/184652 A1 | 12/2013 |
| WO | WO 2017/073189 A1 | 5/2017 |

* cited by examiner

US 11,184,755 B2

COMMUNICATION APPARATUS, COMMUNICATION METHOD, AND PROGRAM

CROSS REFERENCE TO PRIOR APPLICATION

This application is a National Stage Patent Application of PCT International Patent Application No. PCT/JP2018/017740 (filed on May 8, 2018) under 35 U.S.C. § 371, which claims priority to Japanese Patent Application No. 2017-100858 (filed on May 22, 2017), which are all hereby incorporated by reference in their entirety.

TECHNICAL FIELD

The present technology relates to a communication apparatus, a communication method, and a program. In particular, the present technology relates to a communication apparatus, a communication method, and a program that are capable of speedily communicating with various parties having different standards and the like.

BACKGROUND ART

There has been known near field communication (NFC) as a standard for contactless short-range wireless communication. NFC has been used in countries and areas around the world for various contactless (CL) services such as public transportation ticket gates, electronic commerce, and identification cards. To each of the CL services, a protocol parameter based on, for example, an encryption scheme, is set individually.

NFC, however, has a plurality of types (Type A, Type B, and Type F) in which radio frequency (RF) communication schemes are different from each other. The types of NFC having widely spread differ in countries and areas on the earth. For example, the first type has widely spread in Japan, whereas the second type has spread in North America; and the third type has spread in Europe.

Thus, in a case where a CL service having adopted NFC is used, the user needs use of an integrated circuit (IC) card, or an electronic device such as a smartphone with an NFC chip embedded therein (hereinafter referred to as NFC device), the IC card and the NFC device being compatible with the type of an NFC reader and the CL service provided on the CL-service provider side.

In a case where an IC card is used, the IC card has been fixed to the compatible type and CL service, so that no issue arises if the user selects an appropriate IC card.

On the other hand, in a case where an NFC device is used, the NFC device is often compatible with the plurality of types and a plurality of CL services. Thus, there is required that processing of making the settings of the NFC device be compatible with the type of the NFC reader and the CL service. Specifically, for example, in a case where the NFC device is a smartphone, additional works are required, such as activation, by the user, of an application program corresponding to the CL service to be used.

Note that, there has already been proposed a technology of: using a situation in that the types having widely spread are different in areas on the earth; receiving of global positioning signals (GPS signals) to specify an area where an NFC device is located; and making the settings of the NFC device be compatible with a type having widely spread in the area (refer to, for example, Patent Document 1).

CITATION LIST

Patent Document

Patent Document 1: Japanese Patent Application Laid-Open No. 2011-217043

SUMMARY OF THE INVENTION

Problems to be Solved by the Invention

For the technology described in Patent Document 1, an NFC reader for a CL service to be used may not be of a type having widely spread in the area. In that case, communication fails between the NFC reader of the type different from a type having widely spread in the area and an NFC device having set so as to be compatible with the type having widely spread in the area.

Furthermore, even if the NFC reader for the CL service to be used is of the type having widely spread in the area, the NFC reader may belong to the same type, so that the characteristics of RF communication may vary for each model within a prescribed range. Thus, a failure may occur in communication with the NFC device.

Moreover, for the technology described in Patent Document 1, although the NFC device can be made compatible with the type of NFC reader, compatibility with the CL service of the NFC reader is difficult to be made. Thus, additional works by the user are still required.

The present technology has been made in view of such situations, and enables short-range wireless communication to be made speedily with various communication parties different in model and service.

Solutions to Problems

According to a first aspect of the present technology, provided is a communication apparatus including: a first short-range wireless communication unit configured to communicate with a communication party, via first short-range wireless communication; an acquisition unit configured to acquire, prior to the communication via the first short-range wireless communication, identification information notified from the communication party, via second short-range wireless communication wider in communicable range than the first short-range wireless communication; and a control unit configured to control the first short-range wireless communication unit and the acquisition unit, in which the control unit acquires a parameter file corresponding to the identification information having been acquired, and sets, on the basis of the parameter file, a parameter for the first short-range wireless communication to the first short-range wireless communication unit.

According to the first aspect of the present technology, provided is a communication method with a communication apparatus including a first short-range wireless communication unit configured to communicate with a communication party, via first short-range wireless communication, the communication method, by the communication apparatus, including: a step of acquiring, prior to the communication via the first short-range wireless communication, identification information notified from the communication party, via second short-range wireless communication wider in communicable range than the first short-range wireless communication; and a step of acquiring a parameter file corresponding to the identification information having been acquired, and setting, on the basis of the parameter file, a parameter for the first short-range wireless communication to the first short-range wireless communication unit.

According to the first aspect of the present technology, provided is a program for causing a computer to function as: a first short-range wireless communication unit configured to communicate with a communication party, via first short-range wireless communication; an acquisition unit configured to acquire, prior to the communication via the first short-range wireless communication, identification information notified from the communication party, via second short-range wireless communication wider in communicable range than the first short-range wireless communication; and a control unit configured to control the first short-range wireless communication unit and the acquisition unit, in which the control unit acquires a parameter file corresponding to the identification information having been acquired, and sets, on the basis of the parameter file, a parameter for the first short-range wireless communication to the first short-range wireless communication unit.

In the first aspect of the present technology, prior to the communication via the first short-range wireless communication, the identification information notified from the communication party is acquired via the second short-range wireless communication wider in communicable range than the first short-range wireless communication; the parameter file corresponding to the identification information having been acquired is acquired; and on the basis of the parameter file, the parameter for the first short-range wireless communication is set to the first short-range wireless communication unit.

According to a second aspect of the present technology, provided is a communication apparatus including: a first short-range wireless communication unit configured to communicate with a communication party, via first short-range wireless communication; and a notification unit configured to notify, prior to the communication via the first short-range wireless communication, the communication party of identification information via second short-range wireless communication wider in communicable range than the first short-range wireless communication.

According to the second aspect of the present technology, provided is a communication method with a communication apparatus including a first short-range wireless communication unit configured to communicate with a communication party, via first short-range wireless communication, the communication method, by the communication apparatus, including: a step of notifying, prior to the communication via the first short-range wireless communication, the communication party of identification information via second short-range wireless communication wider in communicable range than the first short-range wireless communication.

According to the second aspect of the present technology, provided is a program for causing a computer to function as: a first short-range wireless communication unit configured to communicate with a communication party, via first short-range wireless communication; and a notification unit configured to notify, prior to the communication via the first short-range wireless communication, the communication party of identification information via second short-range wireless communication wider in communicable range than the first short-range wireless communication.

In the second aspect of the present technology, prior to the communication via the first short-range wireless communication, the identification information is notified to the communication party via the second short-range wireless communication wider in communicable range than the first short-range wireless communication.

Effects of the Invention

According to the first aspect of the present technology, the short-range wireless communication can be made speedily with various communication parties different in model and service.

According to the second aspect of the present technology, the identification information can be notified to the communication party, prior to the first short-range wireless communication.

Note that the effects described herein are not necessarily limited, and any of the effects described in the present disclosure may be applicable.

MODE FOR CARRYING OUT THE INVENTION

Hereinafter, the best mode for carrying out the present technology (hereinafter, referred to as an embodiment) will be described in detail with reference to the drawings. Note that the description will be given in the following order.

1. Overview of Present Technology
2. Exemplary Configuration of NFC Communication System as Embodiment of Present Technology
3. Exemplary Configuration of NFC Device 20
4. BLE Packet
5. Operation for Notification of NFC-reader Identification Information Prior to NFC Communication
6. Operation for Notification of CL-service Identification Information Prior to NFC Communication
7. Approach for Simultaneous Acquisition of Plurality of Pieces of NFC-Reader Identification Information
7-1. First Operation for Simultaneous Acquisition of Plurality of Pieces of NFC-Reader Identification Information
7-2. Second Operation for Simultaneous Acquisition of Plurality of Pieces of NFC-reader Identification Information
8. Use Case of NFC System
8-1. First Use Case of NFC System
8-2. Second Use Case of NFC System
8-3. Third Use Case of NFC System
8-4. Fourth Use Case of NFC System
8-5. Fifth Use Case of NFC System
9. Conclusion
10. Execution of Series of Processing with Software

1. OVERVIEW OF PRESENT TECHNOLOGY

The present technology is provided for enabling speedy communication via NFC between various NFC readers of different types and adopted CL services and an NFC device (hereinafter, referred to as NFC communication).

Specifically, prior to the NFC communication, each of the NFC readers notifies the NFC device of NFC-reader identification information associated with the NFC reader or CL-service identification information associated with a CL service, via short-range wireless communication such as BLE wider than NFC in communication range. Here, it is assumed that the NFC communication range is within several tens centimeters, whereas the communication range of, for example, BLE is about several meters to ten meters. However, for actual operation, the output of BLE may be narrowed such that the communication range is about 2 to 3 m.

Note that NFC can be regarded as first short-range wireless communication of the present technology, and BLE can be regarded as second short-range wireless communication of the present technology.

For the NFC device, an RF parameter or a protocol parameter is set on the basis of the NFC-reader identification information or the CL-service identification information that has been notified. As a result, NFC communication thereafter is made speedily and reliably.

2. EXEMPLARY CONFIGURATION OF NFC COMMUNICATION SYSTEM AS EMBODIMENT OF PRESENT TECHNOLOGY

Figure 1:
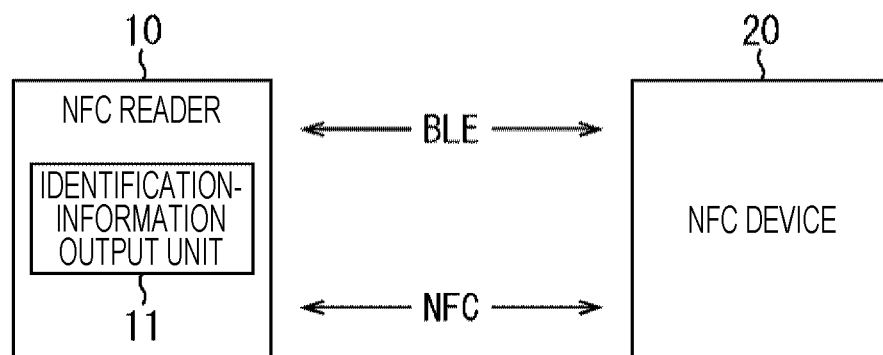
FIG. 1 is a block diagram of an exemplary configuration of an NFC communication system with the present technology applied.

FIG. 1 illustrates an exemplary configuration of an NFC communication system as an embodiment of the present technology.

Note that, in the present specification, a system means a collection of a plurality of constituent elements (e.g., apparatus and modules (parts)), regardless of whether or not all the constituent elements are included in an identical casing. Thus, both a plurality of devices housed in separate casings and in connection via a network, and one device including a plurality of modules housed in one casing are systems.

The NFC communication system illustrated in FIG. 1 includes an NFC reader 10 and an NFC device 20.

The NFC reader 10 includes an identification-information output unit 11. Before the NFC reader 10 makes NFC communication with the NFC device 20, the identification-information output unit 11 uses short-range wireless communication such as BLE to notify the NFC device 20 of at least one of NFC-reader identification information indicating the model of the NFC reader 10 or CL-service identification information indicating a CL service in which the NFC reader 10 is used. The identification-information output unit 11 can be regarded as a notification unit of the present technology.

Note that the short-range wireless communication to be used by the identification-information output unit 11 is not limited to BLE, and any short-range wireless communication can be adopted if the communication range is wider than the communication range of NFC.

The NFC device 20 is an electronic device with an NFC chip embedded therein; and for example, a smartphone, a mobile phone, or a smart watch, is assumed.

Figure 2:
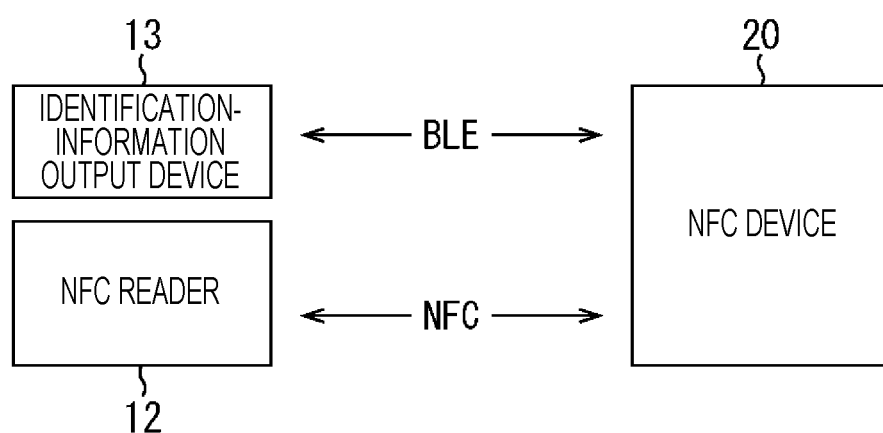
FIG. 2 is a block diagram of a modification of the NFC communication system with the present technology applied.

FIG. 2 illustrates a modification of the NFC communication system. In this modification, an NFC reader 10 is obtained by addition of an identification-information output device 13 to a conventional NFC reader 12. Similarly to the identification-information output unit 11, before the NFC reader 12 makes NFC communication with an NFC device 20, the identification-information output device 13 uses short-range wireless communication such as BLE to notify the NFC device 20 of at least one of NFC-reader identification information indicating the model of the NFC reader 12 or CL-service identification information indicating a CL service in which the NFC reader 12 is used.

3. EXEMPLARY CONFIGURATION OF NFC DEVICE 20

Figure 3:
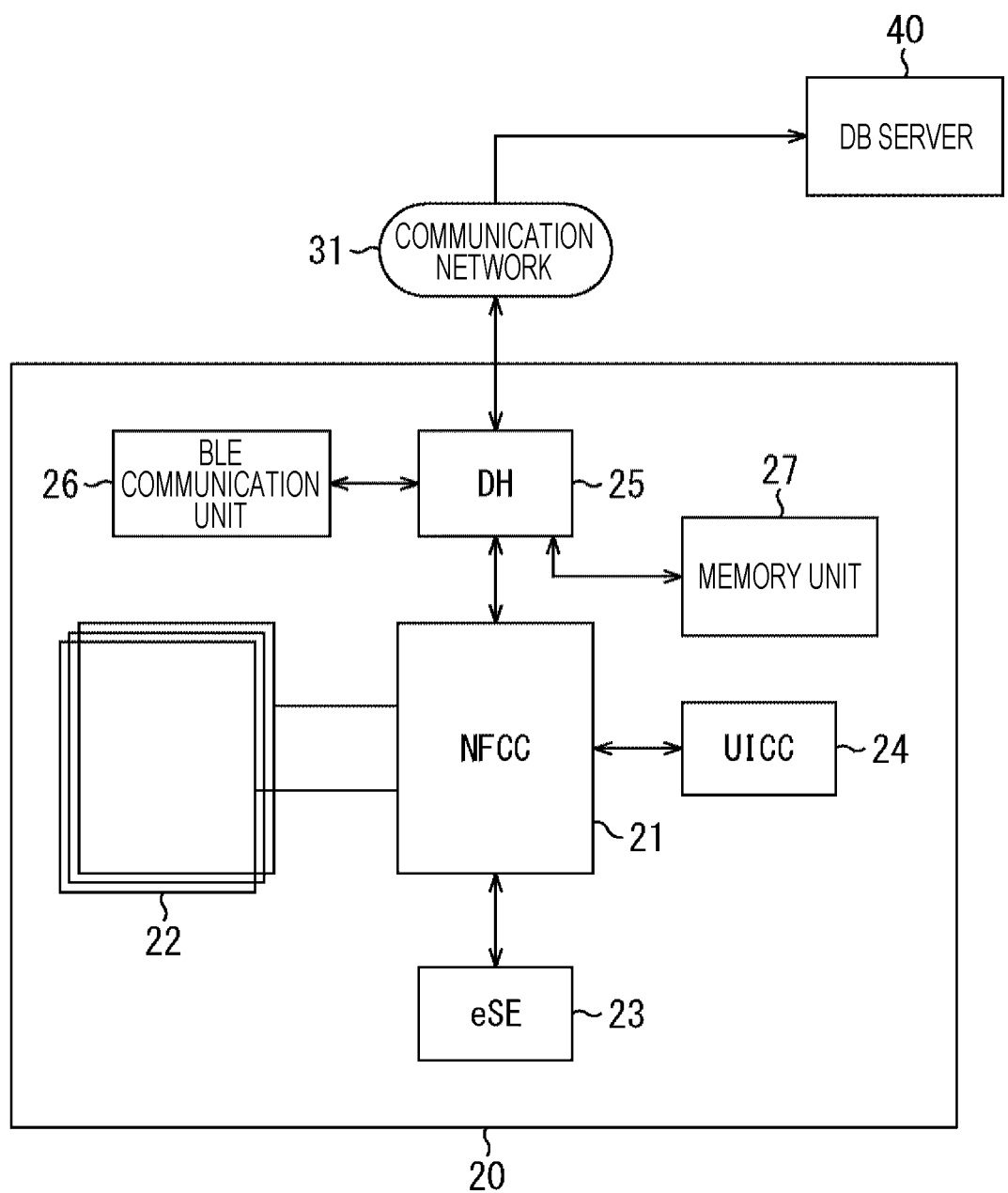
FIG. 3 is a block diagram of an exemplary configuration of an NFC device.

FIG. 3 illustrates an exemplary configuration of the NFC device 20.

The NFC device 20 includes an NFC controller (NFCC) 21, an antenna 22, an embedded secure element (eSE) 23, a universal integrated circuit card (UICC) 24, a device host (DH) 25, a BLE communication unit 26, and a memory unit 27. The NFCC 21, the eSE 23, the UICC 24, the DH 25, and the memory unit 27 are connected wiredly to be communicable mutually.

The NFC controller (NFCC) 21 makes short-range wireless communication with the NFC reader 10 via the antenna 22. Note that the NFCC 21 can be regarded as a first short-range wireless communication unit of the present technology.

The embedded secure element (eSE) 23 provides a security function in each CL service, or each CL service.

The universal integrated circuit card (UICC) 24 includes, for example, a subscriber identity module (SIM) card, and provides each CL service.

The device host (DH) 25 controls the NFCC 21 and the BLE communication unit 26. Note that the DH 25 can be regarded as a control unit of the present technology.

Furthermore, the DH 25 generates an RF parameter file and a protocol parameter file corresponding to the NFC reader 10 that has successfully made communication, and holds the files in the memory unit 27.

It is assumed that in the RF parameter file, NFC-device-model identification information indicating the model of the NFC device 20; NFC-reader identification information indicating the model of the NFC reader 10 that has successfully made communication; and an RF parameter that has been set in the communication are described.

It is assumed that the RF parameter includes at least one of load modulation amplitude LMA, a resonance-frequency setting value, a reception-sensitivity adjustment value, the Q-value of a resonance circuit, or the amount of phase shift in active load modulation (ALM) (phase control).

It is assumed that in the protocol parameter file, the NFC-device-model identification information indicating the model of the NFC device 20; the CL-service information indicating the CL service adopted for the NFC reader 10 that has successfully made communication; and a protocol parameter that has been set in the communication are described.

Furthermore, the DH 25 makes connection with a data base (DB) server 40 via a communication network 31 and causes the DB server 40 to accumulate the RF parameter file and the protocol parameter file that have been generated. Moreover, the DH 25 acquires the RF parameter file and the protocol parameter file accumulated in the DB server 40.

Moreover, the DH 25 sets the RF parameter to the NFCC 21 by reading from the memory unit 27, or on the basis of the RF parameter file acquired from the DB server 40.

Note that the RF parameter set by the DH 25 to the NFCC 21 may be set in the form of the address and set value of an RF-parameter setting register uniquely defined for each NFCC. For example, there may be set an abstract value as a physical quantity, such as an RF technology, an LMA level value, and a phase offset value of active load modulation (ALM).

Similarly, the DH 25 sets the protocol parameter to the NFCC 21 by reading from the memory unit 27, or on the basis of the protocol parameter file acquired from the DB server 40.

The BLE communication unit 26 communicates with the NFC reader 10 via BLE, and notifies the NFCC 21 of the NFC-reader identification information and the CL-service identification information notified from the NFC reader 10 via the DH 25. Note that the BLE communication unit 26 can be regarded as an acquisition unit of the present technology.

The memory unit 27 is an internal storage of the NFC device 20, and holds the RF parameter file and the protocol parameter file generated by the DH 25. Note that the memory unit 27 can be regarded as a holding unit of the present technology.

The communication network 31 refers to an interactive telecommunication network such as a mobile-terminal-device communication network or the Internet.

The DB server 40 is shared by a plurality of NFC devices 20, and accumulates the RF parameter file and the protocol parameter file transmitted from each NFC device 20. Furthermore, the DB server 40 supplies the RF parameter file and the protocol parameter that are accumulated, in response to a request from the NFC device 20.

Here, there will be described the relationship between the RF parameter file held in the memory unit 27 of the NFC device 20 and the RF parameter file to be accumulated in the DB server 40, and the relationship between the protocol parameter file held in the memory unit 27 of the NFC device 20 and the protocol parameter file to be accumulated in the DB server 40.

Figure 4:
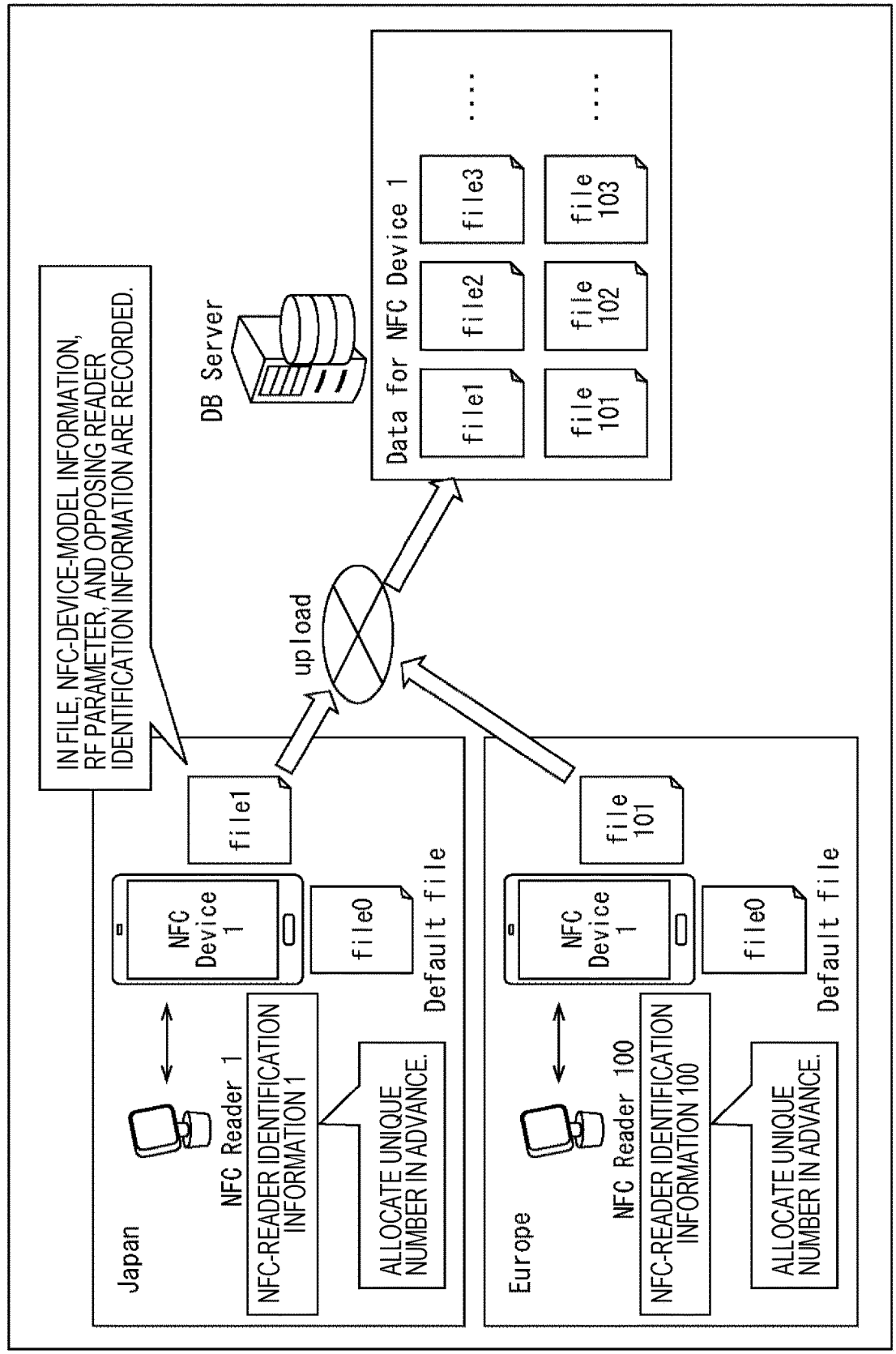
FIG. 4 is an illustration of the relationship between a radio frequency (RF) parameter file held in each NFC device and the RF parameter file to be accumulated in a data base (DB) server.

FIG. 4 illustrates the relationship between an RF parameter file held in the memory unit 27 of the NFC device 20 to be released in Japan, an RF parameter file held in the memory unit 27 of the NFC device 20 to be released in Europe, and the RF parameter files to be accumulated in the DB server 40.

In the memory unit 27 of the NFC device 20 to be released in Japan, RF parameter files (file 1, file 2, and file 3 . . . ) have been held in advance at delivery. The RF parameter files include RF parameters adjusted to allow mutual communication with a plurality of NFC readers 10 used in Japan, for passing a test.

On the other hand, in the memory unit 27 of the NFC device 20 to be released in Europe, RF parameter files (file 101, file 102, and file 103 . . . ) have been held in advance at delivery. The RF parameter files include RF parameters adjusted to allow mutual communication with a plurality of NFC readers 10 used in Europe, for passing a test.

Note that the NFC devices 20 to be released in Japan and the respective memory units 27 of the NFC devices 20 to be released in Europe may hold individually, in advance, a default RF parameter file (file 0) in which an RF parameter set at a standard value is described, the RF parameter not being adjusted with a specific NFC reader 10.

On the other hand, it is assumed that all the RF parameter files held in advance in the memory units 27 of the NFC devices 20 to be released in countries and areas are accumulated in the DB server 40. Note that, it is assumed that, after release of each NFC device 20, an RF parameter file including an RF parameter adjusted with each NFC reader 10 having come into use in each country and area is added and accumulated into the DB server 40 as needed.

Therefore, in such a manner, the amount of data held in each memory unit 27 can be reduced larger than a case where a large number of RF parameter files each corresponding to a combination among a plurality of NFC readers 10 used around the world and pieces of information regarding locations where the NFC readers 10 are installed, have been held in advance in the memory units 27 of NFC devices 20 to be released in Japan or the like.

Note that, for example, in a case where an NFC device 20 released in Japan is used in Europe, the NFC device 20 is only required to receive, prior to NFC communication, NFC-reader identification information via BLE or the like, from an NFC reader 10, and acquire the corresponding RF parameter file from the DB server 40 on the basis of the NFC-reader identification information.

Figure 5:
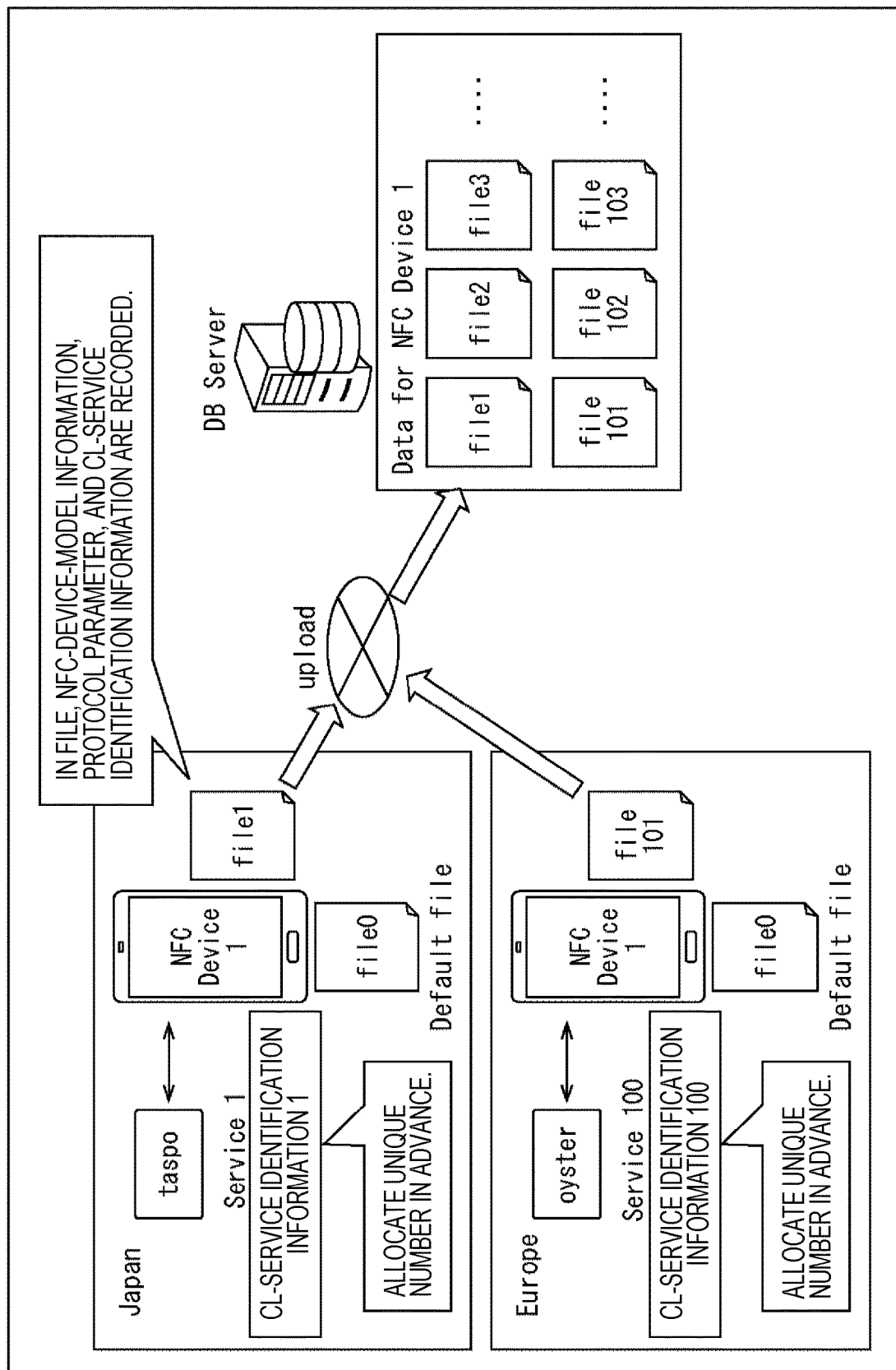
FIG. 5 is an illustration of the relationship between a protocol parameter file held in each NFC device and the protocol parameter file to be accumulated in the DB server.

Next, FIG. 5 illustrates the relationship between a protocol parameter file held in the memory unit 27 of the NFC device 20 to be released in Japan, a protocol parameter file held in the memory unit 27 of the NFC device 20 to be released in Europe, and the protocol parameter files accumulated in the DB server 40.

In the memory unit 27 of the NFC device 20 to be released in Japan, protocol parameter files (file 1, file 2, and file 3 . . . ) have been held in advance at delivery. The protocol parameter files include protocol parameters adjusted to allow correspondence to each CL service provided in Japan.

On the other hand, in the memory unit 27 of the NFC device 20 to be released in Europe, protocol parameter files (file 101, file 102, and file 103 . . . ) have been held in advance at delivery. The protocol parameter files include protocol parameters adjusted to allow correspondence to each CL service provided in Europe.

Note that the respective memory units 27 of the NFC devices 20 to be released in Japan and Europe may hold individually, in advance, a default protocol parameter file (file 0) corresponding to EMVCo service, including Europay, MasterCard, or VISA protocol as a standard protocol parameter, the protocol parameter not being adjusted to allow correspondence to a specific CL service.

On the other hand, it is assumed that all the protocol parameter files held in the memory units 27 of the NFC devices 20 to be released in the countries and areas are accumulated in the DB server 40. Note that, it is assumed that, a protocol parameter file including a protocol parameter corresponding to a CL service that has appeared after release of each NFC device 20 is added and accumulated into the DB server 40 as needed.

Therefore, in such a manner, the amount of data held in each memory unit 27 can be reduced larger than a case where a large number of protocol parameter files each corresponding to a combination among a plurality of CL services provided around the world and pieces of location information regarding places where the CL services are provided, have been held in advance in the memory units 27 of NFC devices 20 to be released in Japan or the like.

Note that, for example, in a case where an NFC device 20 released in Japan is used in Europe, the NFC device 20 is only required to receive, prior to NFC communication, CL-service identification information via BLE or the like, from an NFC reader 10, and acquire the corresponding protocol parameter file from the DB server 40 on the basis of the CL-service identification information.

4. BLE PACKET

As described above, BLE is used in order to notify the NFC device 20 of the NFC-reader identification information or the CL-service identification information, from the NFC reader 10 side. Specifically, part of advertising communication included in BLE is used.

Figure 6:
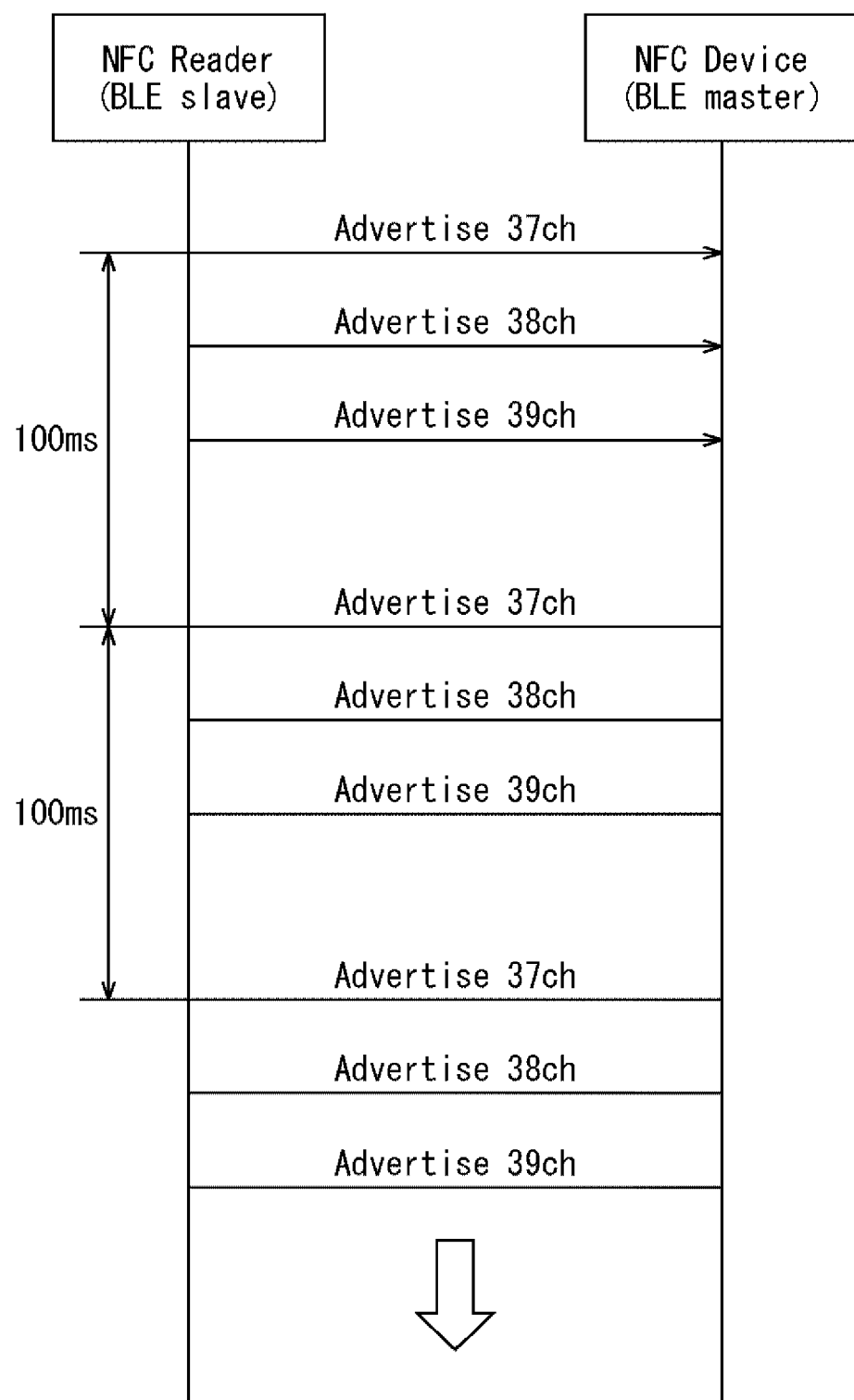
FIG. 6 is a timing chart of advertising communication in Bluetooth (registered trademark) Low Energy (BLE).

FIG. 6 is a timing chart of advertising communication by the NFC reader 10.

In advertising communication, for example, an advertisement packet is cyclically transmitted at an interval of 100 ms.

Figure 7:
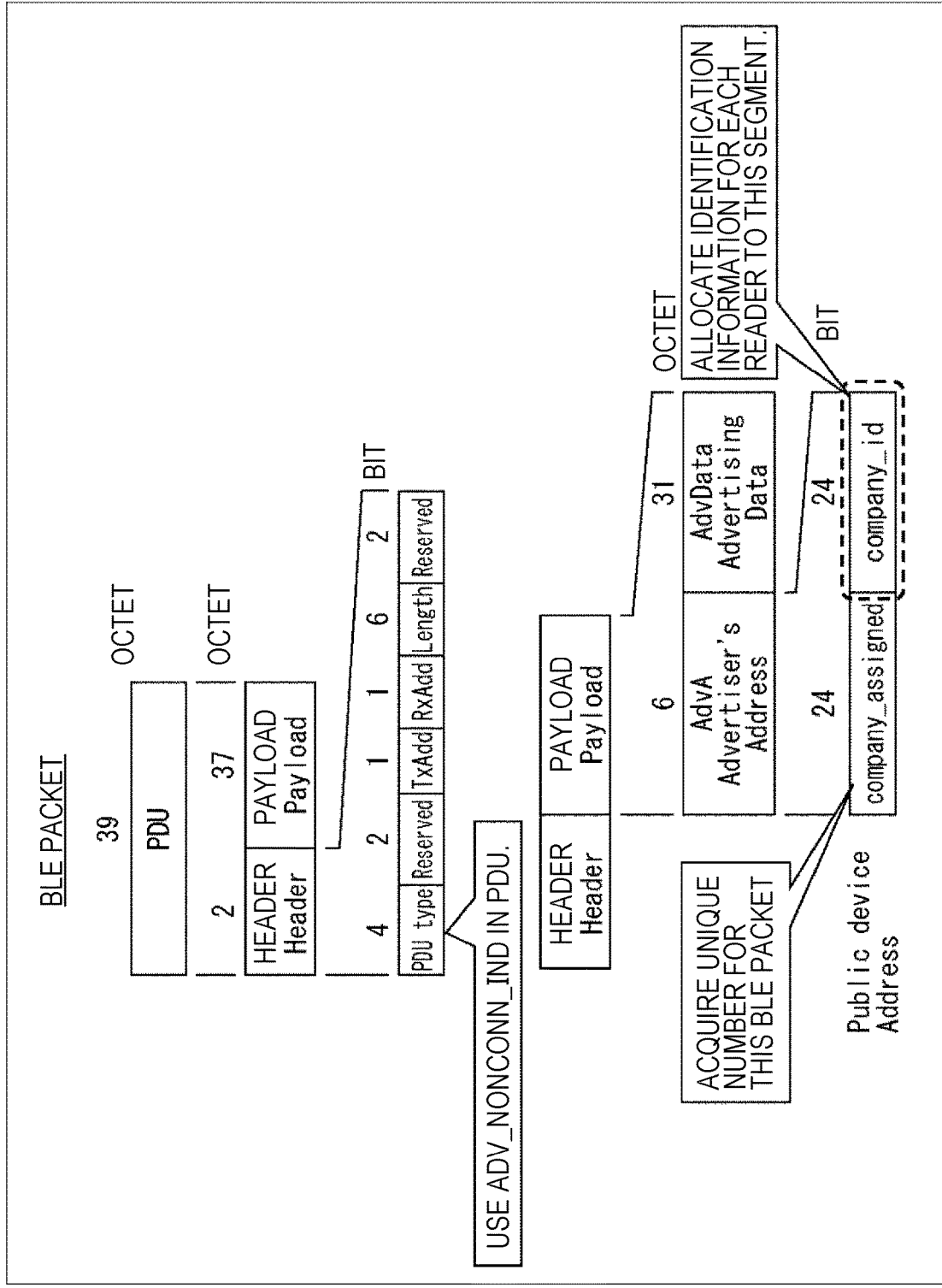
FIG. 7 is an illustration of a data structure of an advertisement packet.

FIG. 7 is an illustration of a data structure of the advertisement packet cyclically transmitted in the advertising communication.

In a case where the NFC-reader identification information is stored in the advertisement packet, a packet data unit (PDU) type described in the first 4 bits of the header of a PDU packet is set to ADV_NONCONN_IND. Then, the NFC-reader identification information is stored in company_id described in the latter 24 bits of the payload of the PDU packet, and a unique number indicating that the NFC-reader identification information is stored in the company_id is described in company_assigned in the first 24 bits of the payload.

Note that the CL-service identification information is only required to be stored in the advertisement packet in a similar manner. In other words, the PDU type described in the first 4 bits of the header of the PDU packet is set to ADV_NONCONN_IND. Then, the CL-service identification information is stored in the company_id described in the latter 24 bits of the payload of the PDU packet, and a unique number indicating that the CL-service identification information is stored in the company_id is described in the company_assigned in the first 24 bits of the payload.

Note that the NFC-reader identification information and the CL-service identification information may be simultaneously notified with the advertisement packet.

5. OPERATION FOR NOTIFICATION OF NFC-READER IDENTIFICATION INFORMATION PRIOR TO NFC COMMUNICATION

Figure 8:
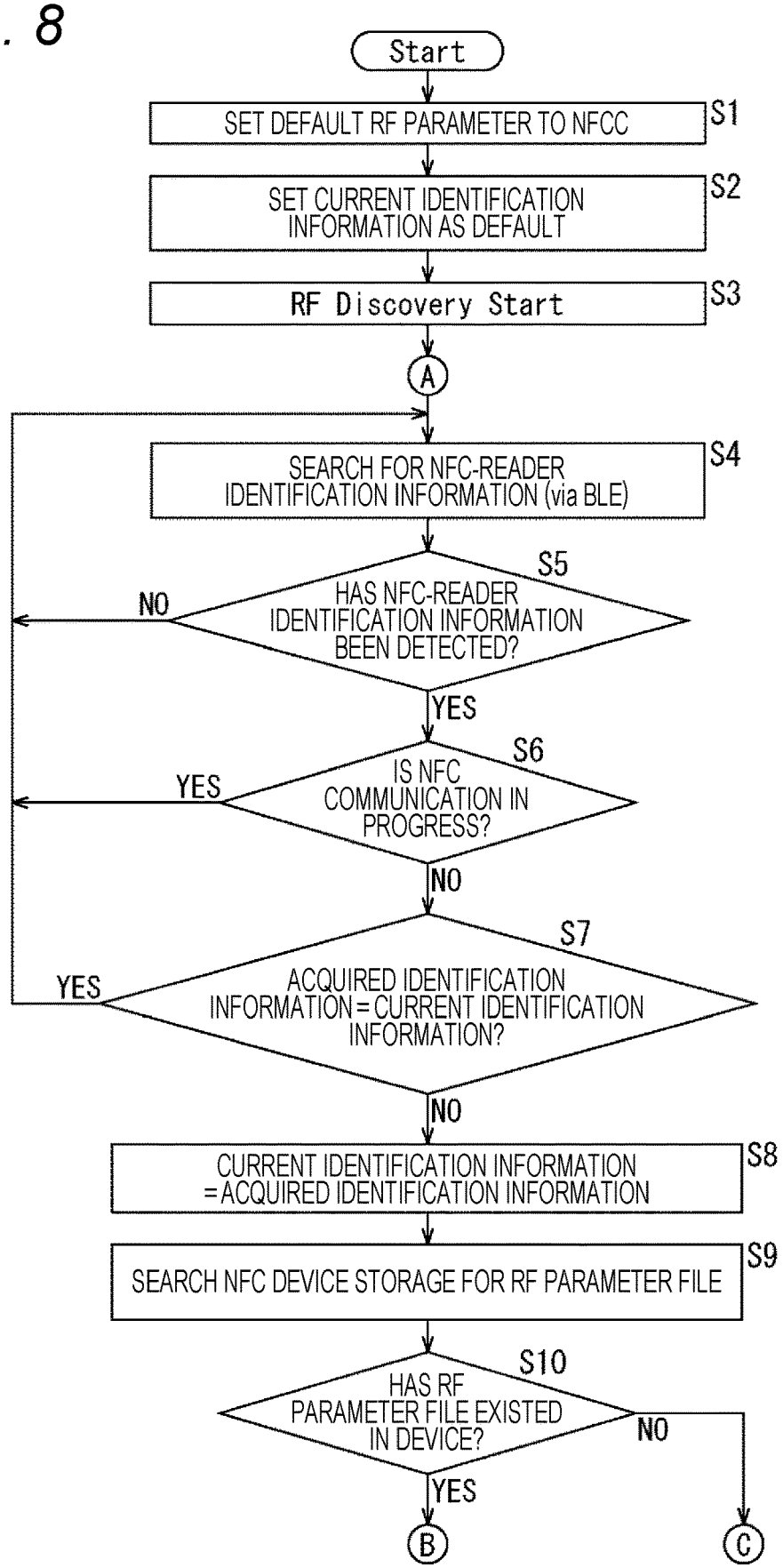
FIG. 8 is a flowchart for describing RF-parameter setting processing on the basis of NFC-reader identification information.
Figure 9:
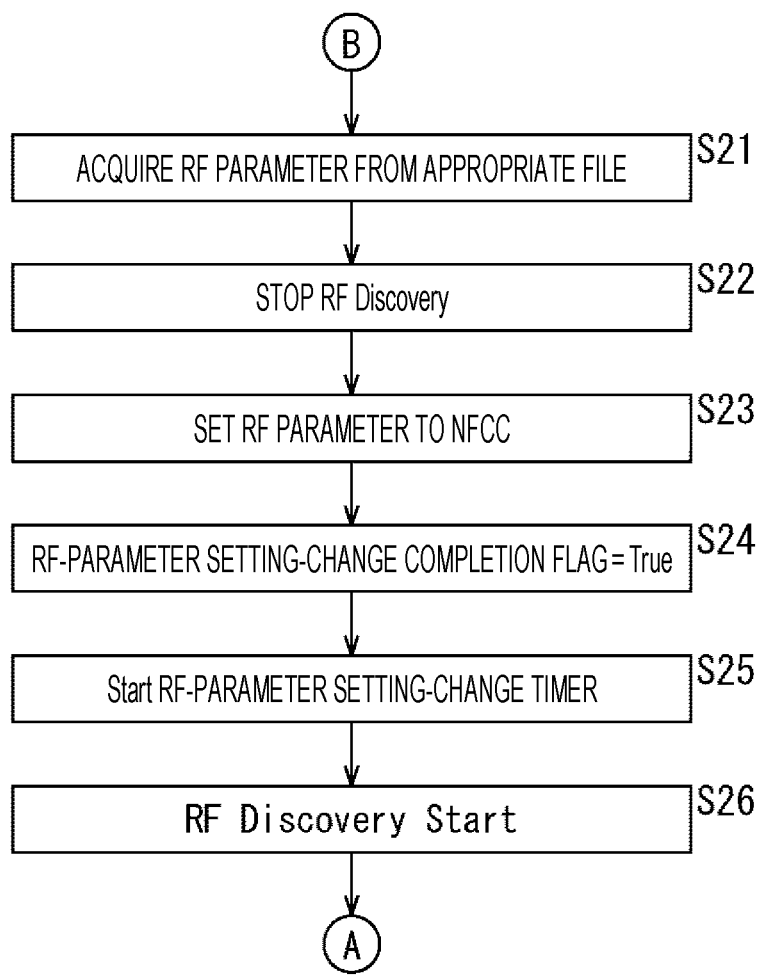
FIG. 9 is a flowchart for describing the RF-parameter setting processing on the basis of NFC-reader identification information.
Figure 10:
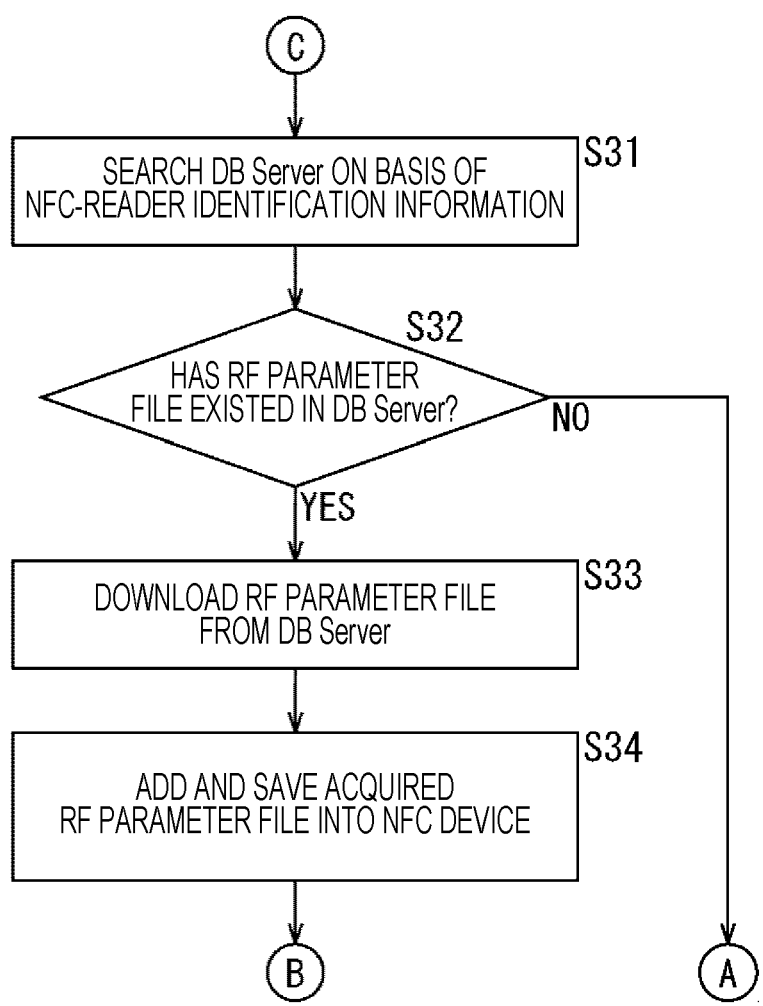
FIG. 10 is a flowchart for describing the RF-parameter setting processing on the basis of the NFC-reader identification information processing.

FIGS. 8 to 10 are flowcharts for describing operation after activation of the NFC device 20, in a case where the NFC-reader identification information is notified prior to NFC communication.

In step S1, the DH 25 sets the RF parameter to the NFCC 21 on the basis of the default RF parameter file that has been held in the memory unit 27. In step S2, the DH 25 sets current identification information by default. In step S3, the NFCC 21 starts RF Discovery for seeking a party of NFC communication, in accordance with control from the DH 25.

Next, in step S4, the BLE communication unit 26 verifies a BLE advertisement packet in accordance with control from the DH 25 to start searching for the NFC-reader identification information notified from the NFC reader 10. In step S5, it is determined that whether or not the NFC-reader identification information has been detected successfully. Here, in a case where the NFC-reader identification information has been non-detected, the processing returns to step S4.

In a case where the NFC-reader identification information has been detected successfully in step S5, the successfully-detected NFC-reader identification information is acquired, and then the processing proceeds to step S6. In step S6, the DH 25 determines whether or not NFC communication is currently in progress. Here, in a case where it is determined that the NFC communication is in progress, the processing returns to step S4.

In step S6, in a case where the DH 25 determines that the NFC communication is not in progress, the processing proceeds to step S7. In step S7, the DH 25 determines whether or not the successfully-acquired NFC-reader identification information and the current identification information are identical to each other. Here, in a case where it is determined that the successfully-acquired NFC-reader identification information and the current identification information are identical, the NFC device 20 has already been compatible with the NFC reader 10 corresponding to the successfully-acquired NFC-reader identification information, so that the processing returns to step S4.

In step S7, in a case where it is determined that the successfully-acquired NFC-reader identification information and the current identification information are different from each other, the processing proceeds to step S8. In step S8, the NFCC 21 updates the current identification information to the successfully-acquired NFC-reader identification information.

Next, in step S9, the DH 25 starts, in the memory unit 27, seeking an RF parameter file corresponding to the successfully-acquired NFC-reader identification information (current identification information). In step S10, the DH 25 determines whether or not the RF parameter file corresponding to the successfully-acquired NFC-reader identification information has been held in the memory unit 27. Here, in a case where it is determined that the corresponding RF parameter file has been held in the memory unit 27, the processing proceeds to step S21 in FIG. 9.

In step S21, the DH 25 acquires the RF parameter file from the memory unit 27. In step S22, the NFCC 21 stops the RF Discovery in accordance with control from the DH 25. Thereafter, in step S23, the DH 25 sets, to the NFCC 21, the RF parameter described in the RF parameter file acquired from the memory unit 27. Moreover, in step S24, the DH 25 sets an RF-parameter setting-change completion flag to True, and in step S25, starts clocking with an RF-parameter setting-change timer.

Next, in step S26, the NFCC 21 restarts the stopped RF Discovery, in accordance with control from the DH 25. At this stage, the NFCC 21 has been set with the optimal RF parameter, so that NFC communication can be made with high accuracy. Thereafter, the processing returns to step S4, and the subsequent steps are repeated.

On the other hand, in a case where it is determined in step S10 that the RF parameter file corresponding to the successfully-acquired NFC-reader identification information has not been held in the memory unit 27, the processing proceeds to step S31 in FIG. 10.

In step S31, the DH 25 makes connection to the DB server 40 via the communication network 31, and starts seeking the RF parameter file corresponding to the successfully-acquired NFC-reader identification information. In step S32, the DH 25 determines whether or not the RF parameter file has been accumulated in the DB server 40. Here, in a case where it is determined that the RF parameter file has been accumulated in the DB server 40, the processing proceeds to step S33.

In step S33, the DH 25 downloads the RF parameter file from the DB server 40.

In step S34, the DH 25 causes the memory unit 27 to hold the RF parameter file downloaded from the DB server 40. Thereafter, the processing proceeds to step S21 in FIG. 9. In this case, the RF parameter is set to the NFCC 21 on the basis of the RF parameter file downloaded from the DB server 40.

On the other hand, in a case where it is determined in step S32 that the corresponding RF parameter file has not been accumulated in the DB server 40, the processing returns to step S4 in FIG. 8. In this case, the default RF parameter already set to the NFCC 21 is to be used in communication via NFC.

Figure 11:
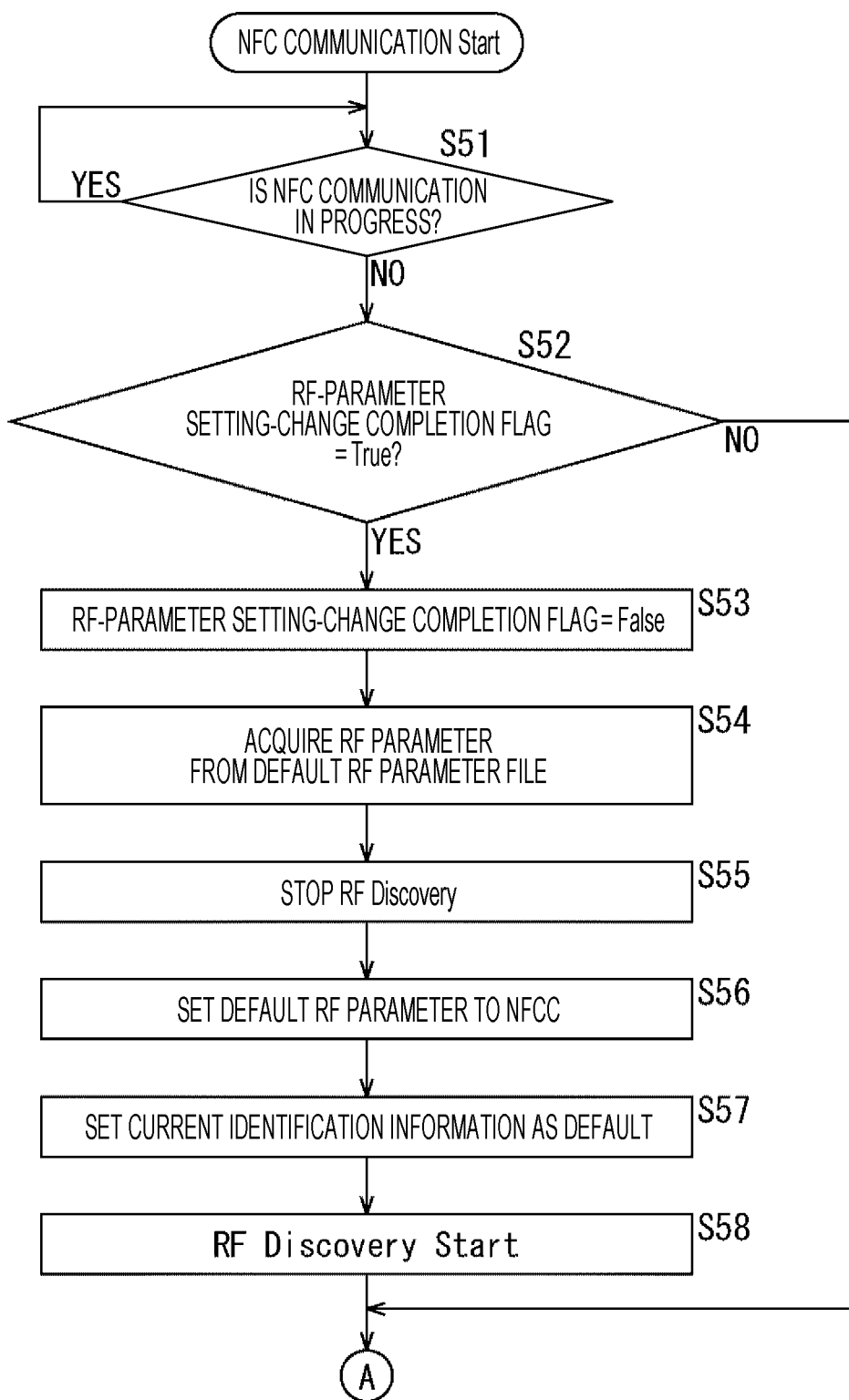
FIG. 11 is a flowchart for describing processing at the end of NFC communication.

Next, FIG. 11 is a flowchart for describing processing when NFC communication has started by placement of the NFC device 20 over the NFC reader 10, after the start of the RF Discovery as the processing in, for example, step S3 described above.

In step S51, the DH 25 determines whether or not the NFC communication is in progress, and stands by until the NFC communication ends. In a case where the NFC communication has ended, the processing proceeds to step S52. In step S52, the DH 25 verifies the RF-parameter setting-change flag and determines whether or not the RF-parameter setting-change flag is True. Here, in a case where it is determined that the RF-parameter setting-change flag is True, the processing proceeds to step S53, and then the setting of the RF parameter to the NFCC 21 is returned to the default.

In other words, in step S53, the DH 25 sets the RF-parameter setting-change flag to False. In step S54, the DH 25 acquires the default RF parameter file from the memory unit 27. In step S55, the NFCC 21 stops the RF Discovery in accordance with control from the DH 25. Thereafter, in step S56, the DH 25 sets, to the NFCC 21, the RF parameter described in the default RF parameter file acquired from the memory unit 27.

In step S57, the NFCC 21 sets the current identification information by default. In step S58, the NFCC 21 restarts the RF Discovery for seeking a party of NFC communication, in accordance with control from the DH 25. Thereafter, the processing returns to step S4 in FIG. 8, and the subsequent steps are repeated.

On the other hand, in a case where it is determined in step S52 that the RF-parameter setting-change flag is not True, due to the default RF-parameter setting to the NFCC 21, steps S53 to S58 are skipped and the processing returns to step S4 in FIG. 8, and then the subsequent steps are repeated.

Figure 12:
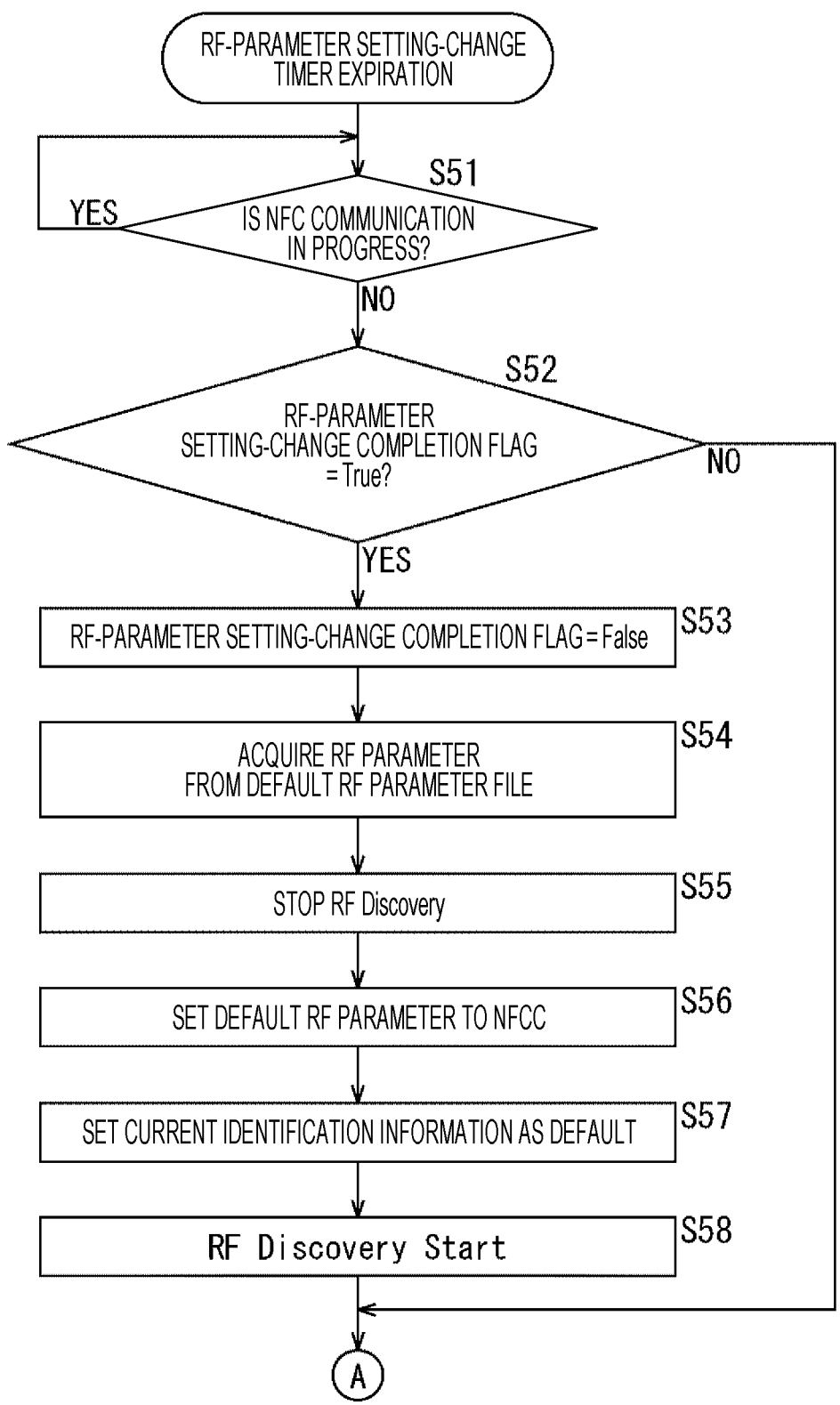
FIG. 12 is a flowchart for describing processing at the expiration of an RF-parameter setting-change timer.

Next, FIG. 12 is a flowchart for describing processing when the RF-parameter setting-change timer after starting clocking as the processing in step S25 described above has measured time exceeding a predetermined expiration time.

Note that this processing is substantially the same as the processing described with reference to FIG. 11; thus, the same step numbers (S51 to S58) are given and the description thereof is omitted.

As described above, the notification of the NFC-reader identification information prior to the NFC communication enables the setting of the RF parameter optimal for the NFCC 21 of the NFC device 20. Thus, the NFC communication thereafter can be made reliably under favorable communication conditions.

6. OPERATION FOR NOTIFICATION OF CL-SERVICE IDENTIFICATION INFORMATION PRIOR TO NFC COMMUNICATION

Figure 13:
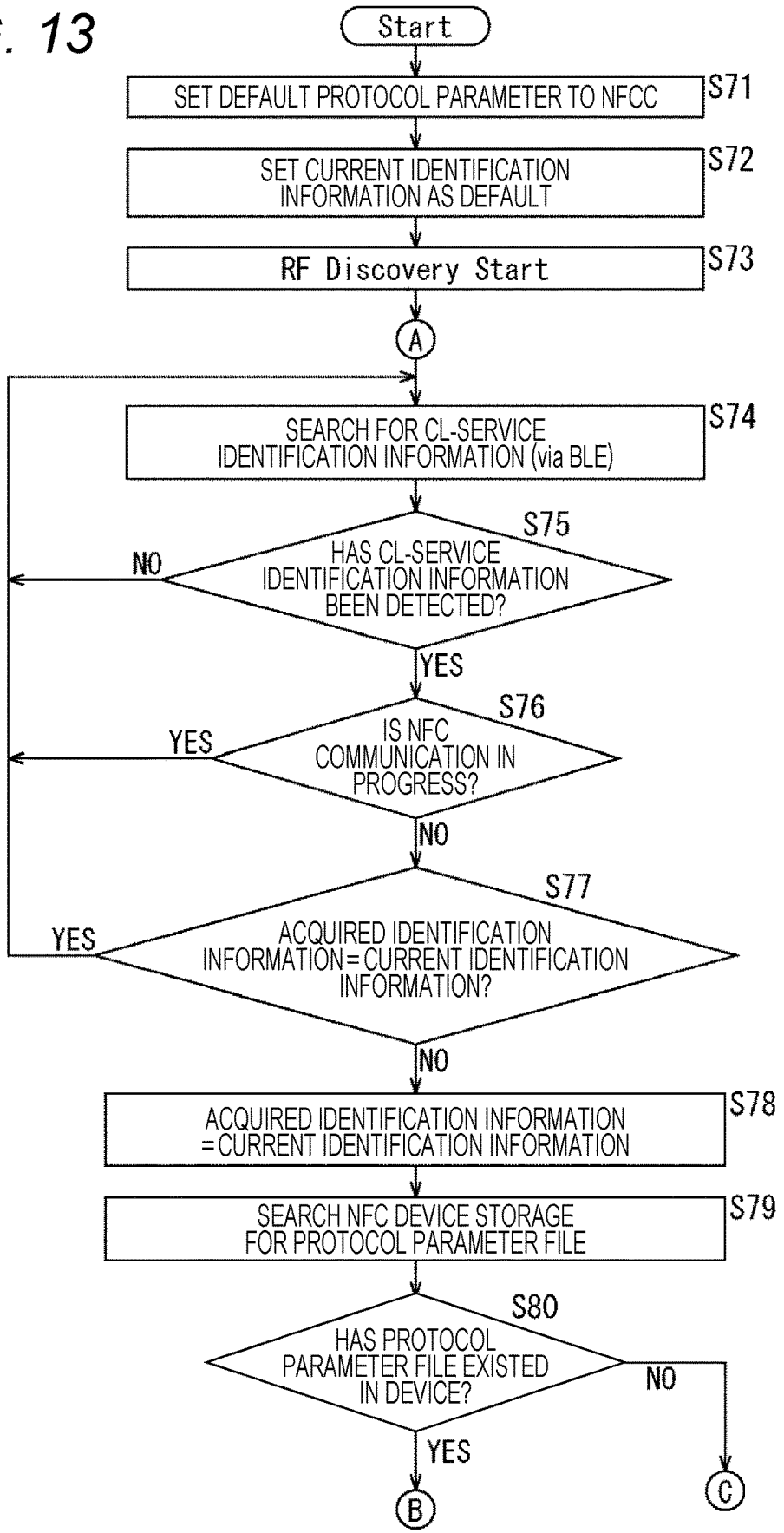
FIG. 13 is a flowchart for describing protocol-parameter setting processing on the basis of CL-service identification information.
Figure 14:
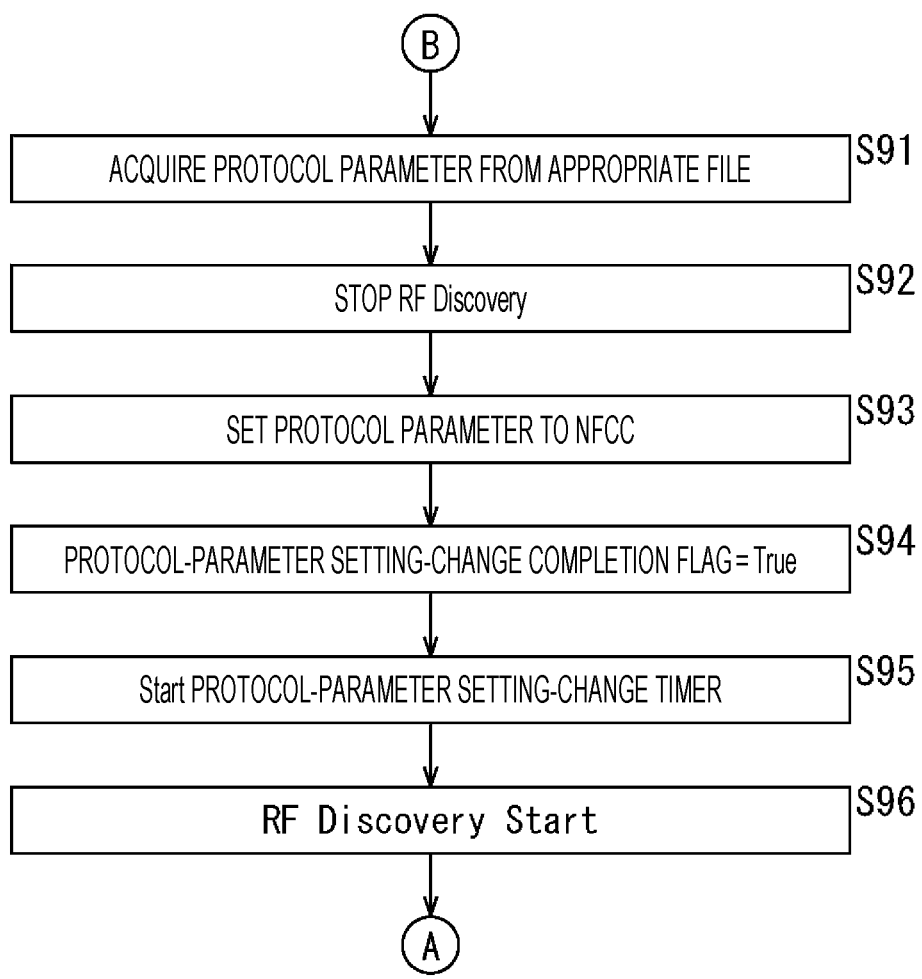
FIG. 14 is a flowchart for describing the protocol-parameter setting processing on the basis of the CL-service identification information.
Figure 15:
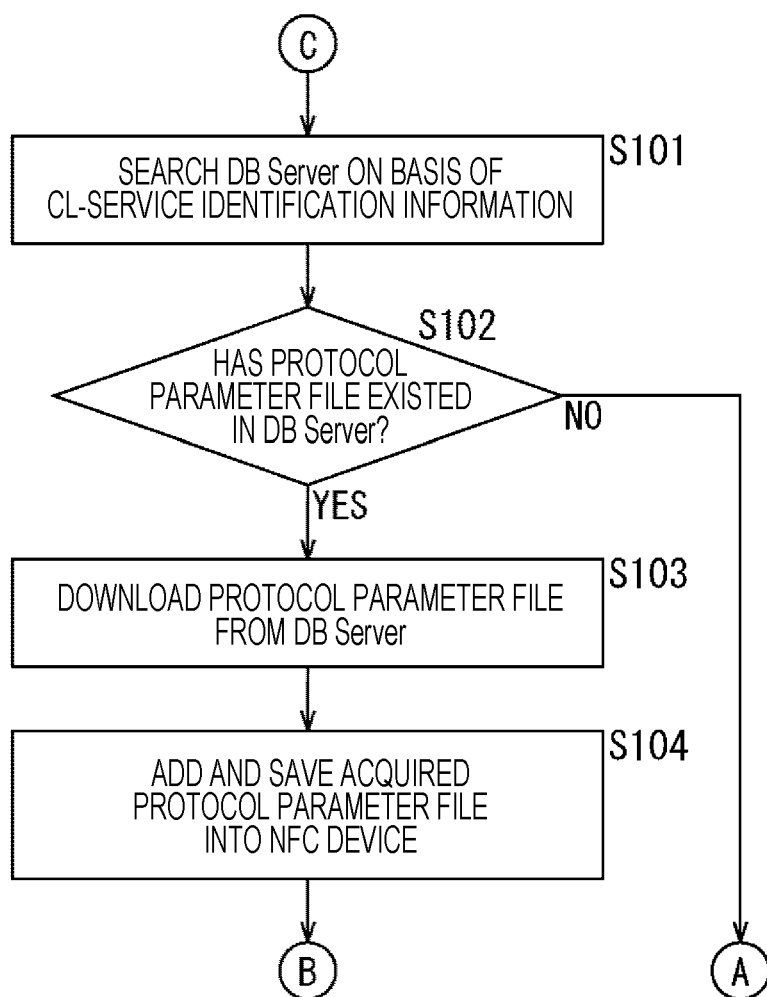
FIG. 15 is a flowchart for describing the protocol-parameter setting processing on the basis of the CL-service identification information.

Next, FIGS. 13 to 15 are flowcharts for describing operation after the activation of the NFC device 20, in a case where the CL-service identification information is notified prior to the NFC communication.

In step S71, the DH 25 sets the protocol parameter to the NFCC 21 on the basis of the default protocol parameter file that has been held in the memory unit 27. In step S72, the DH 25 sets the current identification information by default. In step S73, the NFCC 21 starts the RF Discovery for seeking a party of NFC communication, in accordance with control from the DH 25.

Next, in step S74, the BLE communication unit 26 verifies the BLE advertisement packet to start searching for the CL-service identification information notified from the NFC reader 10. In step S75, it is determined that whether or not the CL-service identification information has been detected successfully. Here, in a case where the CL-service identification information has been non-detected, the processing returns to step S74.

In a case where the CL-service identification information has been detected successfully in step S75, the successfully-detected CL-service identification information is acquired, and the processing proceeds to step S76. In step S76, the DH 25 determines whether or not NFC communication is currently in progress. Here, in a case where it is determined that the NFC communication is in progress, the processing returns to step S74.

In step S76, in a case where it is determined that the NFC communication is not in progress, the processing proceeds to step S77. In step S77, the DH 25 determines whether or not the successfully-acquired CL-service identification information and the current identification information are identical to each other. Here, in a case where it is determined that the successfully-acquired CL-service identification information and the current identification information are identical, the NFC device 20 has already been compatible with the CL service corresponding to the successfully-acquired CL-service identification information, so that the processing returns to step S74.

In step S77, in a case where it is determined that the successfully-acquired CL-service identification information and the current identification information are different from each other, the processing proceeds to step S78. In step S78, the DH 25 updates the current identification information to the successfully-acquired CL-service identification information.

Next, in step S79, the DH 25 starts, in the memory unit 27, seeking a protocol parameter file corresponding to the successfully-acquired CL-service identification information (current identification information). In step S80, the DH 25 determines whether or not the protocol parameter file has been held in the memory unit 27. Here, in a case where it is determined that the protocol parameter file has been held in the memory unit 27, the processing proceeds to step S91 in FIG. 14.

In step S91, the DH 25 acquires the protocol parameter file from the memory unit 27. In step S92, the NFCC 21 stops the RF Discovery in accordance with control from the DH 25. Thereafter, in step S93, the DH 25 sets, to the NFCC 21, the protocol parameter described in the protocol parameter file acquired from the memory unit 27. Moreover, in step S94, the DH 25 sets a protocol-parameter setting-change completion flag to True, and in step S95, starts clocking with a protocol-parameter setting-change timer.

Next, in step S96, the NFCC 21 restarts the stopped RF Discovery, in accordance with control from the DH 25. At this stage, the NFCC 21 has been set with the optimal protocol parameter, so that NFC communication can be made with high accuracy. Thereafter, the processing returns to step S74, and the subsequent steps are repeated.

On the other hand, in a case where it is determined in step S80 that the protocol parameter file corresponding to the successfully-acquired CL-service identification information has not been held in the memory unit 27, the processing proceeds to step S101 in FIG. 15.

In step S101, the DH 25 makes connection to the DB server 40 via the communication network 31, and starts seeking the protocol parameter file. In step S102, the DH 25 determines whether or not the protocol parameter file has been accumulated in the DB server 40. Here, in a case where it is determined that the protocol parameter file has been accumulated in the DB server 40, the processing proceeds to step S103.

In step S103, the DH 25 downloads the protocol parameter file from the DB server 40.

In step S104, the DH 25 causes the memory unit 27 to hold the protocol parameter file downloaded from the DB server 40. Thereafter, the processing proceeds to step S91 in FIG. 14. In this case, the protocol parameter is set to the NFCC 21 on the basis of the protocol parameter file downloaded from the DB server 40.

On the other hand, in a case where it is determined in step S102 that the corresponding CL-service parameter file has not been accumulated in the DB server 40, the processing returns to step S74 in FIG. 13. In this case, the default protocol parameter already set to the NFCC 21 is to be used in communication via NFC.

Figure 16:
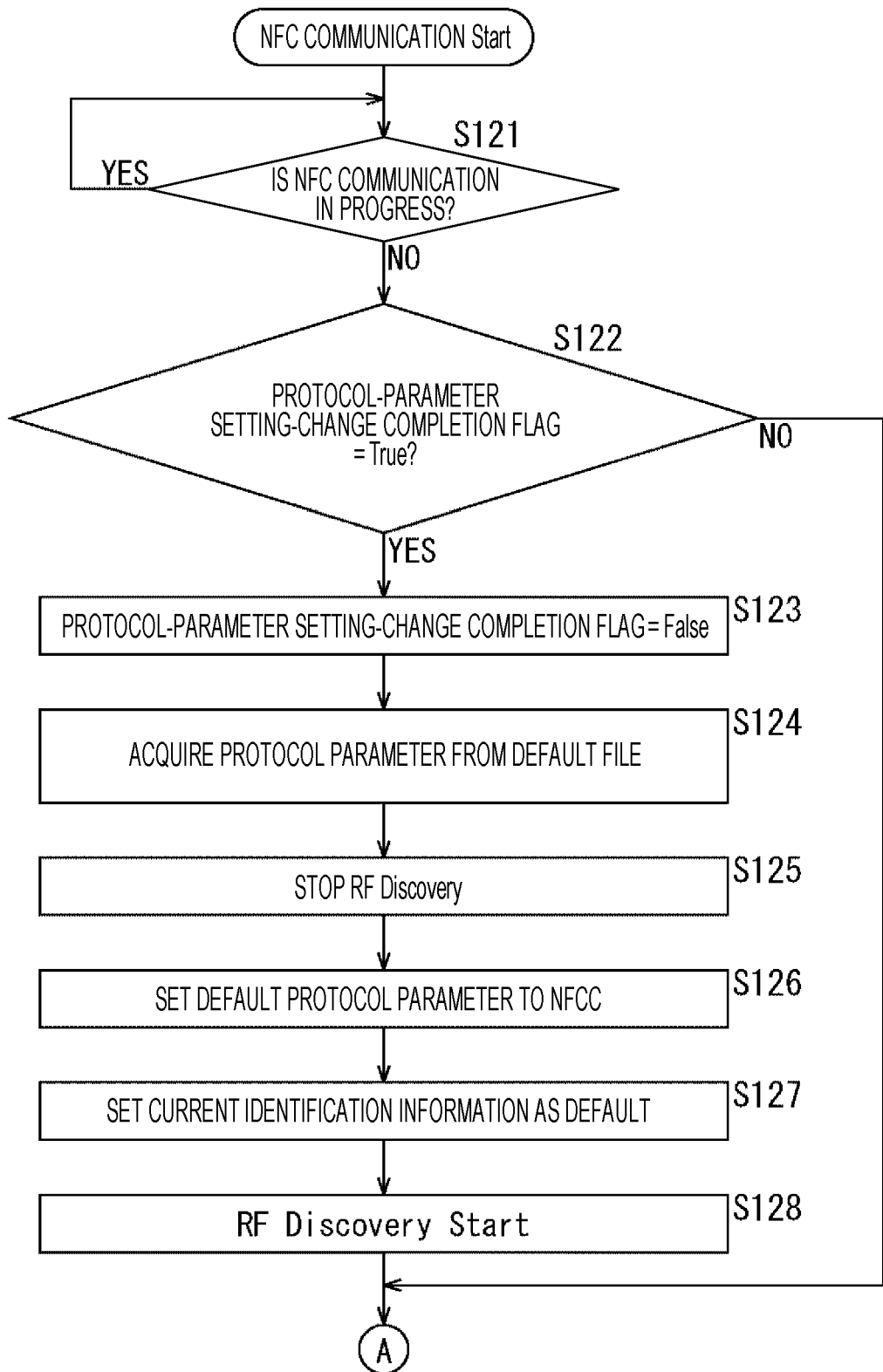
FIG. 16 is a flowchart for describing processing at the end of NFC communication.

Next, FIG. 16 is a flowchart for describing processing when NFC communication has started by placement of the NFC device 20 over the NFC reader 10, after the start of the RF Discovery as the processing in, for example, step S73 described above.

In step S121, the DH 25 determines whether or not the NFC communication is in progress, and stands by until the NFC communication ends. Then, in a case where the NFC communication has ended, the processing proceeds to step S122. In step S122, the DH 25 verifies a protocol-parameter setting-change flag and determines whether or not the protocol-parameter setting-change flag is True. Here, in a case where it is determined that the protocol-parameter setting-change flag is True, the processing proceeds to step S123 in order to return, to the default, the setting of the protocol parameter to the NFCC 21.

In step S123, the DH 25 sets the protocol-parameter setting-change flag to False. In step S124, the DH 25 acquires the default protocol parameter file from the memory unit 27. In step S125, the NFCC 21 stops the RF Discovery in accordance with control from the DH 25. Thereafter, in step S126, the DH 25 sets, to the NFCC 21, the protocol parameter described in the default protocol parameter file acquired from the memory unit 27.

In step S127, the DH 25 sets the current identification information by default. In step S128, the NFCC 21 restarts the RF Discovery for seeking a party of NFC communication, in accordance with control from the DH 25. Thereafter, the processing returns to step S74 in FIG. 13, and the subsequent steps are repeated.

On the other hand, in a case where it is determined in step S122 that the protocol-parameter setting-change flag is not True, due to the default protocol-parameter setting to the NFCC 21, steps S123 to S128 are skipped and the processing returns to step S74 in FIG. 13, and the subsequent steps are repeated.

Figure 17:
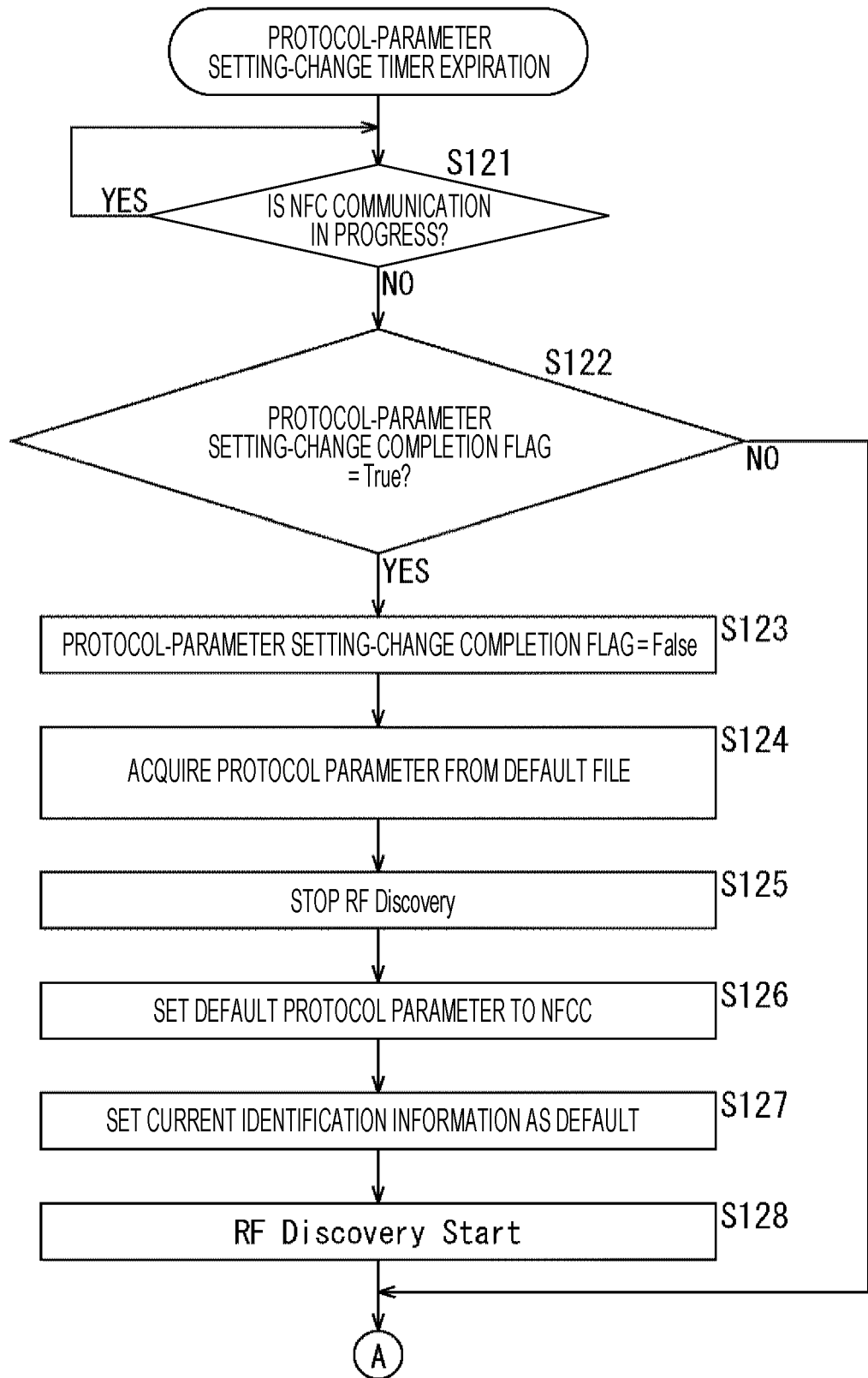
FIG. 17 is a flowchart for describing processing at the expiration of a protocol-parameter setting-change timer.

Next, FIG. 17 is a flowchart for describing processing when the protocol-parameter setting-change timer after starting clocking as the processing in step S95 described above has measured time exceeding a predetermined expiration time.

Note that this processing is substantially the same as the processing described with reference to FIG. 16; thus, the same step numbers (S121 to S128) are given and the description thereof is omitted.

As described above, the notification of the CL-service identification information prior to the NFC communication enables the setting of the protocol parameter optimal for the NFCC 21 of the NFC device 20. Thus, the NFC communication thereafter can be made reliably under favorable communication conditions.

7. APPROACH FOR SIMULTANEOUS ACQUISITION OF PLURALITY OF PIECES OF NFC-READER IDENTIFICATION INFORMATION

In consideration of practical operation of the NFC system, there may also occur that the NFC device 20 simultaneously acquires a plurality of pieces of NFC-reader information from a plurality of different NFC readers 10. In that case, the NFC device 20 is only required to perform a first operation of setting the default RF parameter so as to be capable of corresponding to all of the plurality of pieces of NFC-reader identification information. Alternatively, the NFC device 20 is only required to perform a second operation of selecting one of the plurality of pieces of NFC-reader identification information (e.g., NFC-reader identification information with the highest received signal strength indicator (RSSI) (signal strength)) and setting an RF parameter so as to be capable of corresponding to the selected NFC-reader identification information.

<7-1. First Operation for Simultaneous Acquisition of Plurality of Pieces of NFC-Reader Identification Information>

FIGS. 18 to 21 are flowcharts for describing the first operation in which in a case where the NFC device 20 has simultaneously acquired the plurality of pieces of NFC-reader information from the plurality of different NFC readers 10, the NFC device 20 sets the default RF parameter.

In step S131, the DH 25 sets the RF parameter to the NFCC 21 on the basis of the default RF parameter file which has been held in the memory unit 27. In step S132, the DH 25 sets the current identification information by default. In step S133, the DH 25 sets, to 0, an identification information counter indicating the number of pieces of acquired NFC-reader identification information. In step S134, the NFCC 21 starts the RF Discovery for seeking a party of NFC communication, in accordance with control from the DH 25.

Next, in step S135, the BLE communication unit 26 verifies the BLE advertisement packet to start searching for the NFC-reader identification information notified from the NFC reader 10. In step S136, it is determined that whether or not the NFC-reader identification information has been detected successfully. Here, in a case where the NFC-reader identification information has been non-detected, the processing returns to step S135.

In a case where the NFC-reader identification information has been detected successfully in step S136, the successfully-detected NFC-reader identification information is acquired, and then the processing proceeds to step S137. In step S137, the DH 25 determines whether or not NFC communication is currently in progress. Here, in a case where it is determined that the NFC communication is in progress, the processing returns to step S135.

In step S137, in a case where it is determined that the NFC communication is not in progress, the processing proceeds to step S138. In step S138, the DH 25 determines whether or not the successfully-acquired NFC-reader identification information and the current identification information are identical to each other. Here, in a case where it is determined that the successfully-acquired NFC-reader identification information and the current identification information are identical, the NFC device 20 has already been compatible with the NFC reader 10 corresponding to the successfully-acquired NFC-reader identification information, so that the processing returns to step S135.

In step S138, in a case where it is determined that the successfully-acquired NFC-reader identification information and the current identification information are different from each other, the processing proceeds to step S139. In step S139, the DH 25 determines whether or not the identification information counter is 0. Here, in a case where it is determined that the identification information counter is 0, the processing proceeds to step S140.

In step S140, the DH 25 updates the current identification information to the successfully-acquired NFC-reader identification information. In step S141, the DH 25 updates the identification information counter to 1.

Next, in step S142, the DH 25 starts, in the memory unit 27, seeking an RF parameter file corresponding to the successfully-acquired NFC-reader identification information (current identification information). In step S143, the DH 25 determines whether or not the RF parameter file corresponding to the successfully-acquired NFC-reader identification information has been held in the memory unit 27. Here, in a case where it is determined that the corresponding RF parameter file has been held in the memory unit 27, the processing proceeds to step S151 in FIG. 19.

In step S151, the DH 25 acquires the RF parameter file from the memory unit 27. In step S152, the NFCC 21 stops the RF Discovery in accordance with control from the DH 25. Thereafter, in step S153, the DH 25 sets, to the NFCC 21, the RF parameter described in the RF parameter file acquired from the memory unit 27. Moreover, in step S154, the DH 25 sets the RF-parameter setting-change completion flag to True, and in step S155, starts clocking with the RF-parameter setting-change timer.

Next, in step S156, the NFCC 21 restarts the stopped RF Discovery, in accordance with control from the DH 25. At this stage, the NFCC 21 has been set with the optimal RF parameter, so that NFC communication can be made with high accuracy. Thereafter, the processing returns to step S135 in FIG. 18, and the subsequent steps are repeated.

Figure 20:
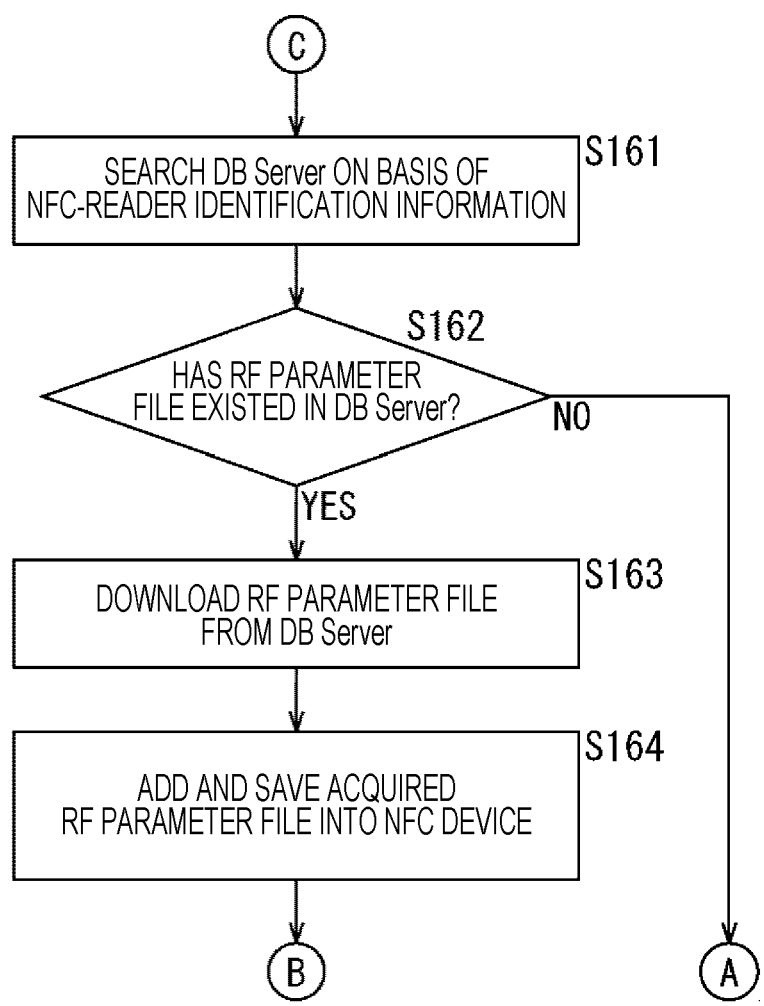
FIG. 20 is a flowchart for describing the RF-parameter setting processing on the basis of the plurality of pieces of NFC-reader identification information.

On the other hand, in a case where it is determined in step S143 that the RF parameter file corresponding to the successfully-acquired NFC-reader identification information has not been held in the memory unit 27, the processing proceeds to step S161 of FIG. 20.

In step S161, the DH 25 makes connection to the DB server 40 via the communication network 31, and starts seeking the RF parameter file corresponding to the successfully-acquired NFC-reader identification information. In step S162, the DH 25 determines whether or not the RF parameter file has been accumulated in the DB server 40. Here, in a case where it is determined that the RF parameter file has been accumulated in the DB server 40, the processing proceeds to step S163.

In step S163, the DH 25 downloads the RF parameter file from the DB server 40.

In step S164, the DH 25 causes the memory unit 27 to hold the RF parameter file downloaded from the DB server 40. Thereafter, the processing proceeds to step S151 in FIG. 19. In this case, the RF parameter is set to the NFCC 21 on the basis of the RF parameter file downloaded from the DB server 40.

Figure 18:
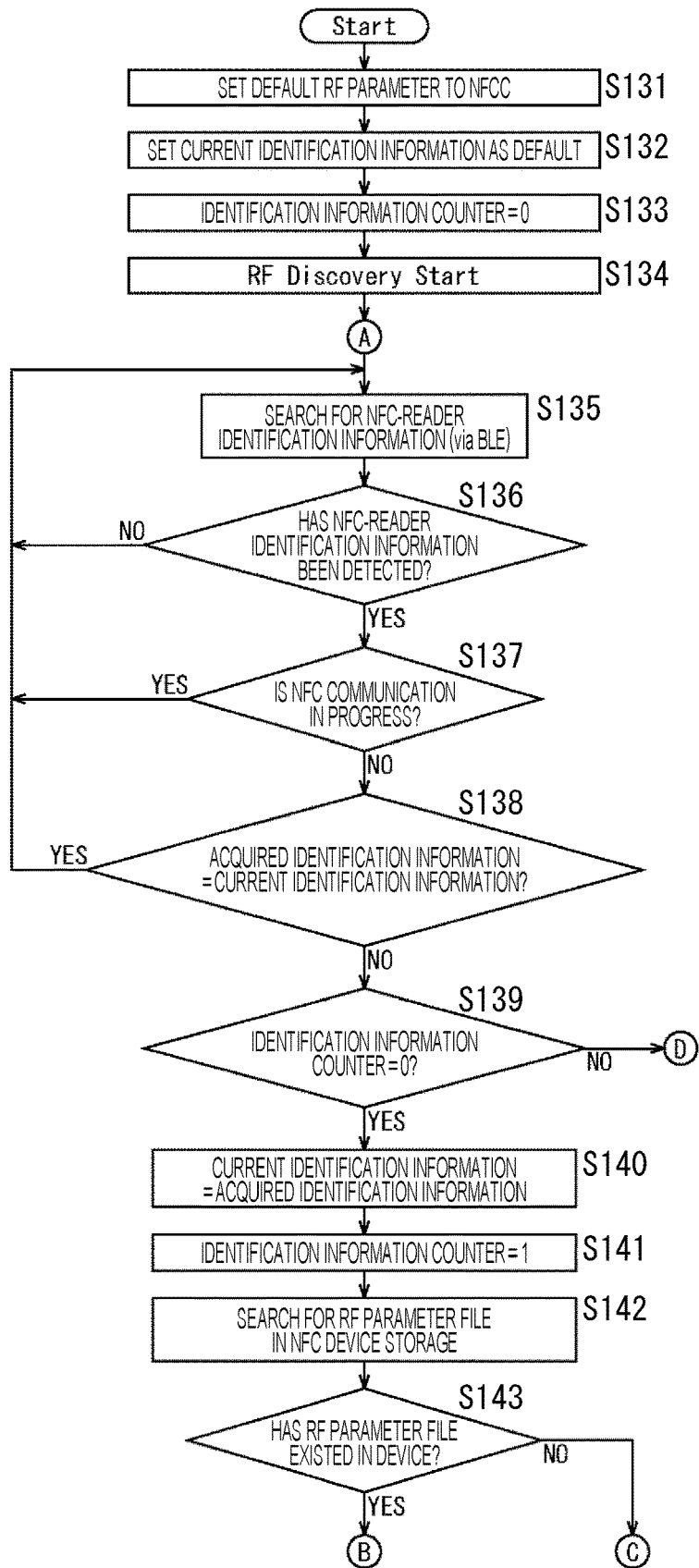
FIG. 18 is a flowchart for describing RF-parameter setting processing on the basis of a plurality of pieces of NFC-reader identification information.
Figure 19:
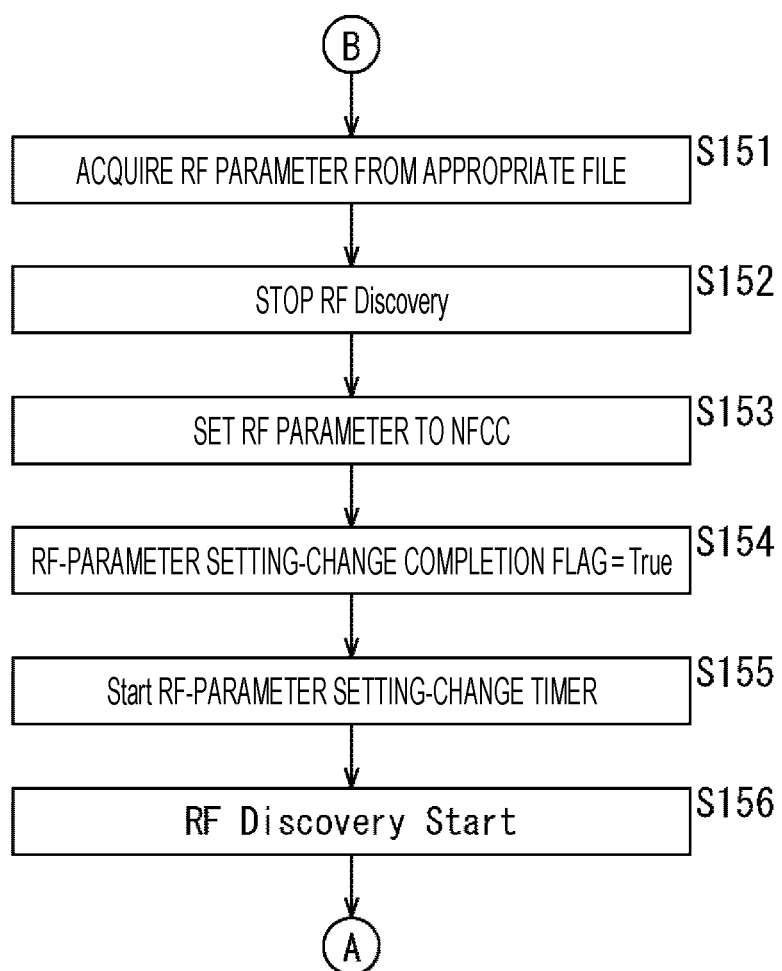
FIG. 19 is a flowchart for describing the RF-parameter setting processing on the basis of the plurality of pieces of NFC-reader identification information.

On the other hand, in a case where it is determined in step S162 that the corresponding RF parameter file has not been accumulated in the DB server 40, the processing returns to step S135 in FIG. 18. In this case, the default RF parameter already set to the NFCC 21 is to be used in communication via NFC.

Figure 21:
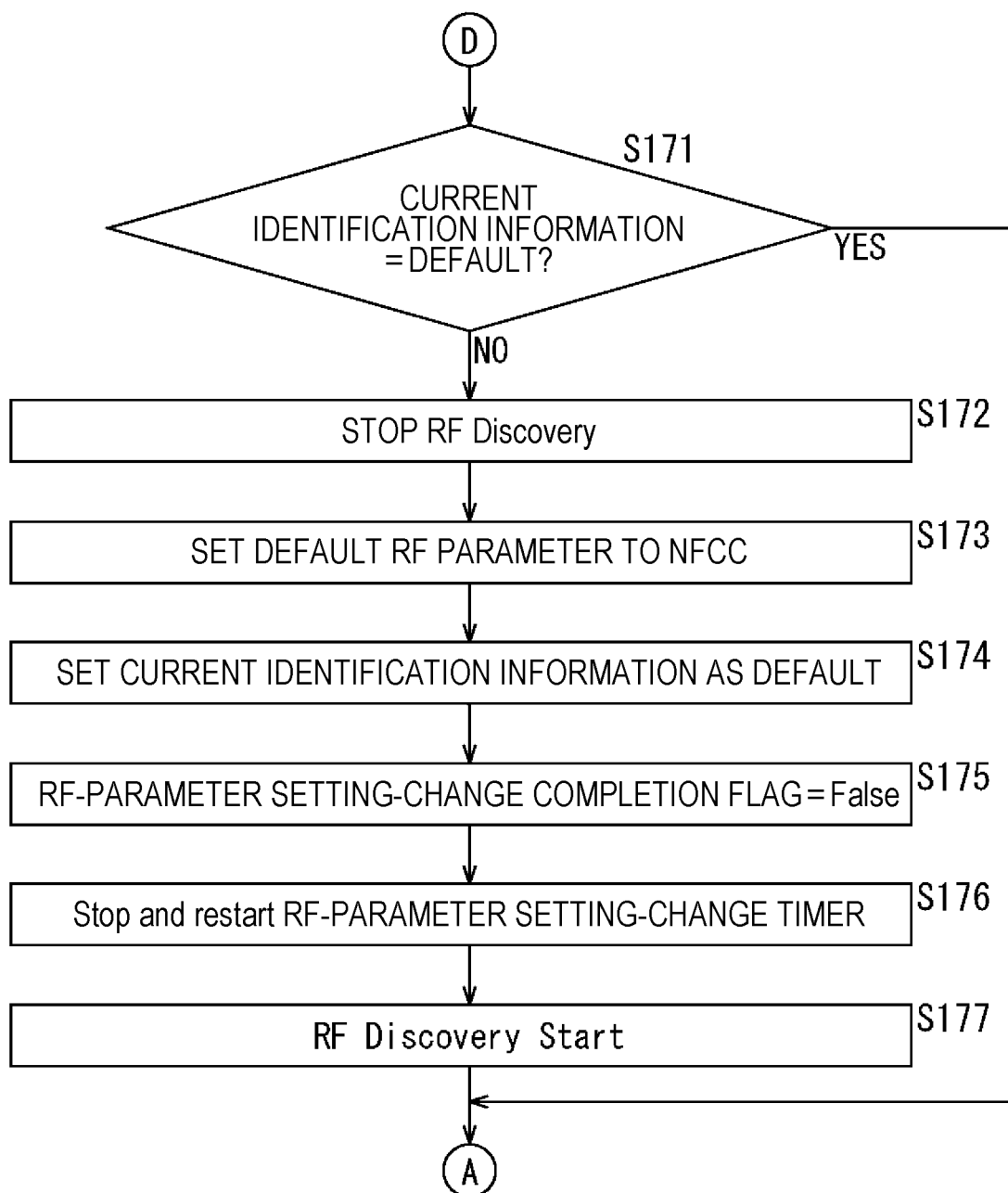
FIG. 21 is a flowchart for describing the RF-parameter setting processing on the basis of the plurality of pieces of NFC-reader identification information.

Furthermore, in a case where it is determined in step S139 that the identification information counter is not 0, the processing proceeds to step S171 in FIG. 21.

In step S171, it is determined whether or not the current identification information is the default. Here, in a case where it is determined that the current identification information is not the default, the processing returns to step S172 in order to return, to the default, the setting of the RF parameter to the NFCC 21.

In step S172, the NFCC 21 stops the RF Discovery in accordance with control from the DH 25. Thereafter, in step S173, the DH 25 acquires the default RF parameter file from the memory unit 27, and sets the RF parameter to the NFCC 21 on the basis of the default RF parameter file. Moreover, the DH 25 sets the current identification information by default in step S174, and sets the RF-parameter setting-change completion flag to False in step S175. Then, in step S176, the DH 25 stops the clocking with the RF-parameter setting-change timer to reset the RF-parameter setting-change timer to 0. Thereafter, in step S177, the NFCC 21 restarts the stopped RF Discovery, in accordance with control from the DH 25. At this stage, the default RF parameter is set to the NFCC 21. Thereafter, the processing returns to step S135 in FIG. 18, and the subsequent steps are repeated.

On the other hand, in a case where it is determined in step S171 that the current identification information is the default, due to the default RF-parameter setting to the NFCC 21, steps S172 to S177 are skipped and the processing returns to step S135 in FIG. 18, and then the subsequent steps are repeated.

Figure 22:
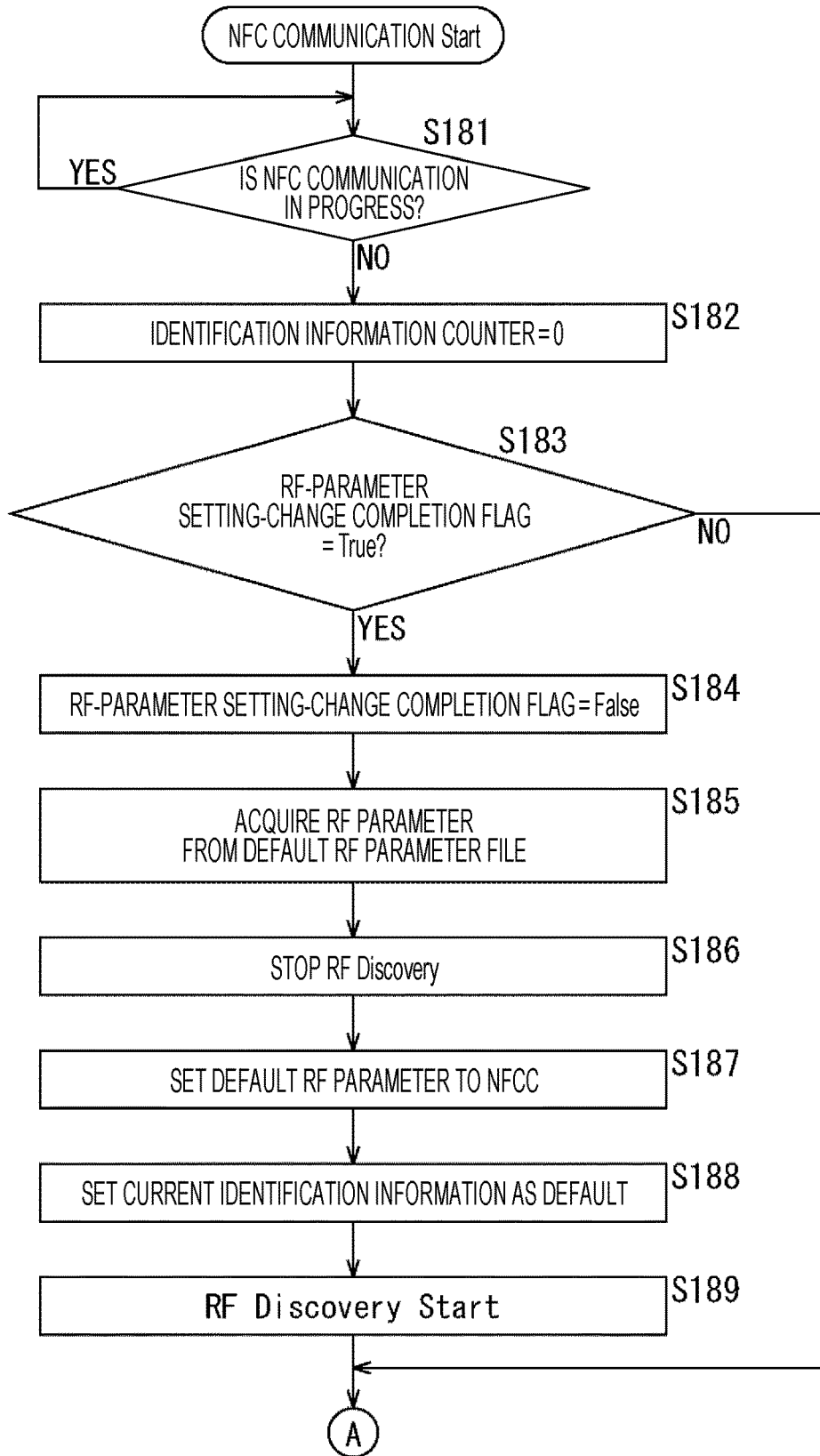
FIG. 22 is a flowchart for describing NFC communication after RF-parameter setting.

Next, FIG. 22 is a flowchart for describing processing when NFC communication has started by placement of the NFC device 20 over the NFC reader 10, after the start of the RF Discovery as the processing in, for example, step S134 described above.

In step S181, the DH 25 determines whether or not the NFC communication is in progress, and stands by until the NFC communication ends. In a case where the NFC communication has ended, the processing proceeds to step S182. In step S182, the DH 25 sets, to 0, the identification information counter indicating the number of pieces of acquired NFC-reader identification information.

In step S183, the DH 25 verifies the RF-parameter setting-change flag and determines whether or not the RF-parameter setting-change flag is True. Here, in a case where it is determined that the RF-parameter setting-change flag is True, the processing proceeds to step S184, and then the setting of the RF parameter to the NFCC 21 is returned to the default.

In other words, in step S184, the DH 25 sets the RF-parameter setting-change flag to False. In step S185, the DH 25 acquires the default RF parameter file from the memory unit 27. In step S186, the NFCC 21 stops the RF Discovery in accordance with control from the DH 25. Thereafter, in step S187, the DH 25 sets, to the NFCC 21, the RF parameter described in the default RF parameter file acquired from the memory unit 27.

In step S188, the DH 25 sets the current identification information by default. In step S189, the NFCC 21 restarts the RF Discovery for seeking a party of NFC communication, in accordance with control from the DH 25. Thereafter, the processing returns to step S135 in FIG. 18, and the subsequent steps are repeated.

On the other hand, in a case where it is determined in step S183 that the RF-parameter setting-change flag is not True, due to the default RF-parameter setting to the NFCC 21, steps S84 to S189 are skipped, and the processing returns to step S135 in FIG. 18, and then the subsequent steps are repeated.

Figure 23:
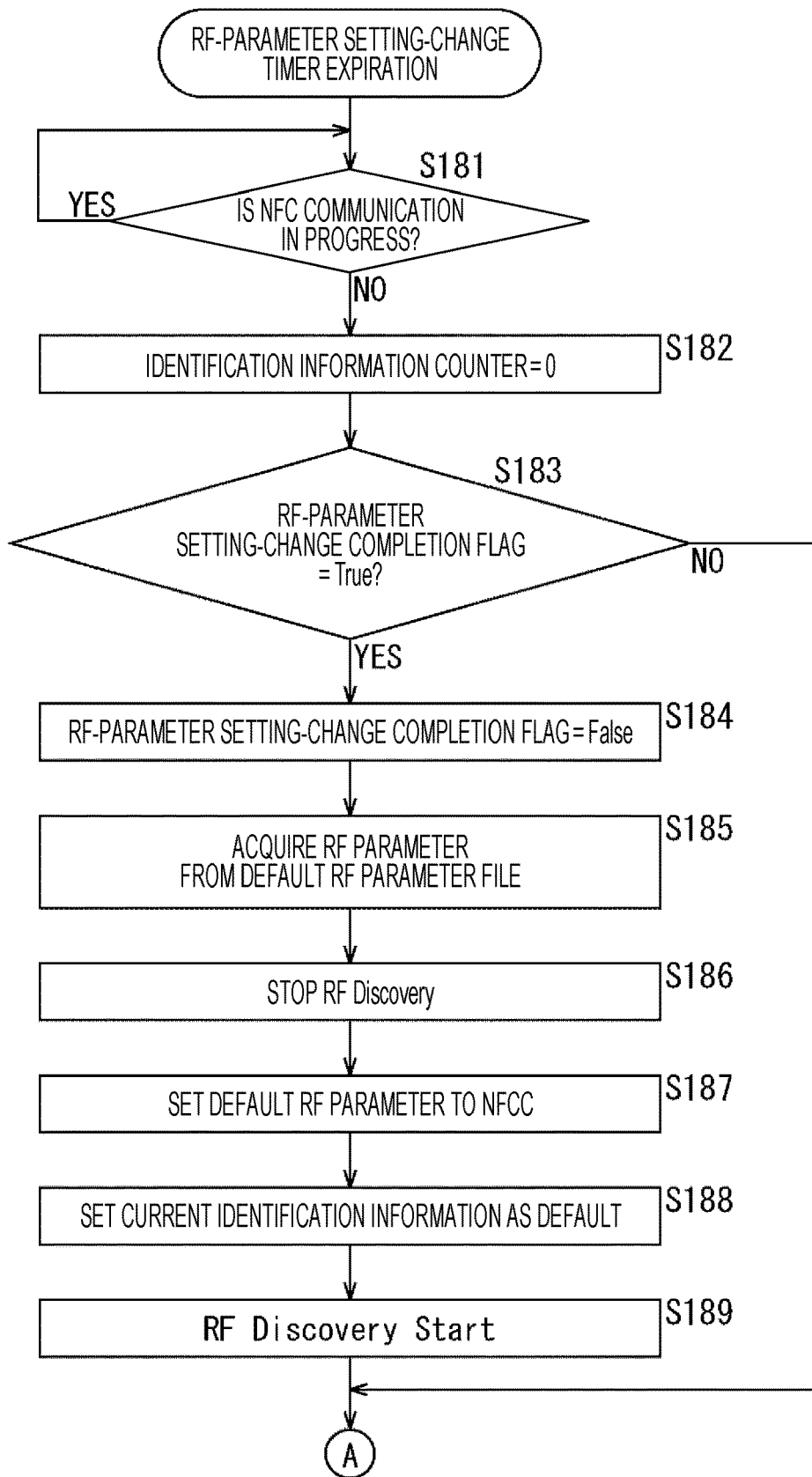
FIG. 23 is a flowchart for describing processing at the expiration of the timer after change of the RF-parameter setting.

Next, FIG. 23 is a flowchart for describing processing when the RF-parameter setting-change timer after starting clocking as the processing in step S155 described above has measured time exceeding a predetermined expiration time.

Note that this processing is substantially the same as the processing described with reference to FIG. 22; thus, the same step numbers (S181 to S189) are given and the description thereof is omitted.

As described above, the first operation in the case of the acquisition of the plurality of pieces of NFC-reader identification information prior to the NFC communication enables the NFC device 20 to set the default RF parameter to the NFCC 21.

Note that also in a case where a plurality of pieces of CL-service identification information has been acquired prior to the NFC communication, the NFC device 20 may be allowed to set the default protocol parameter to the NFCC 21 in a similar manner.

<7-2. Second Operation for Simultaneous Acquisition of Plurality of Pieces of NFC-Reader Identification Information>

Figure 24:
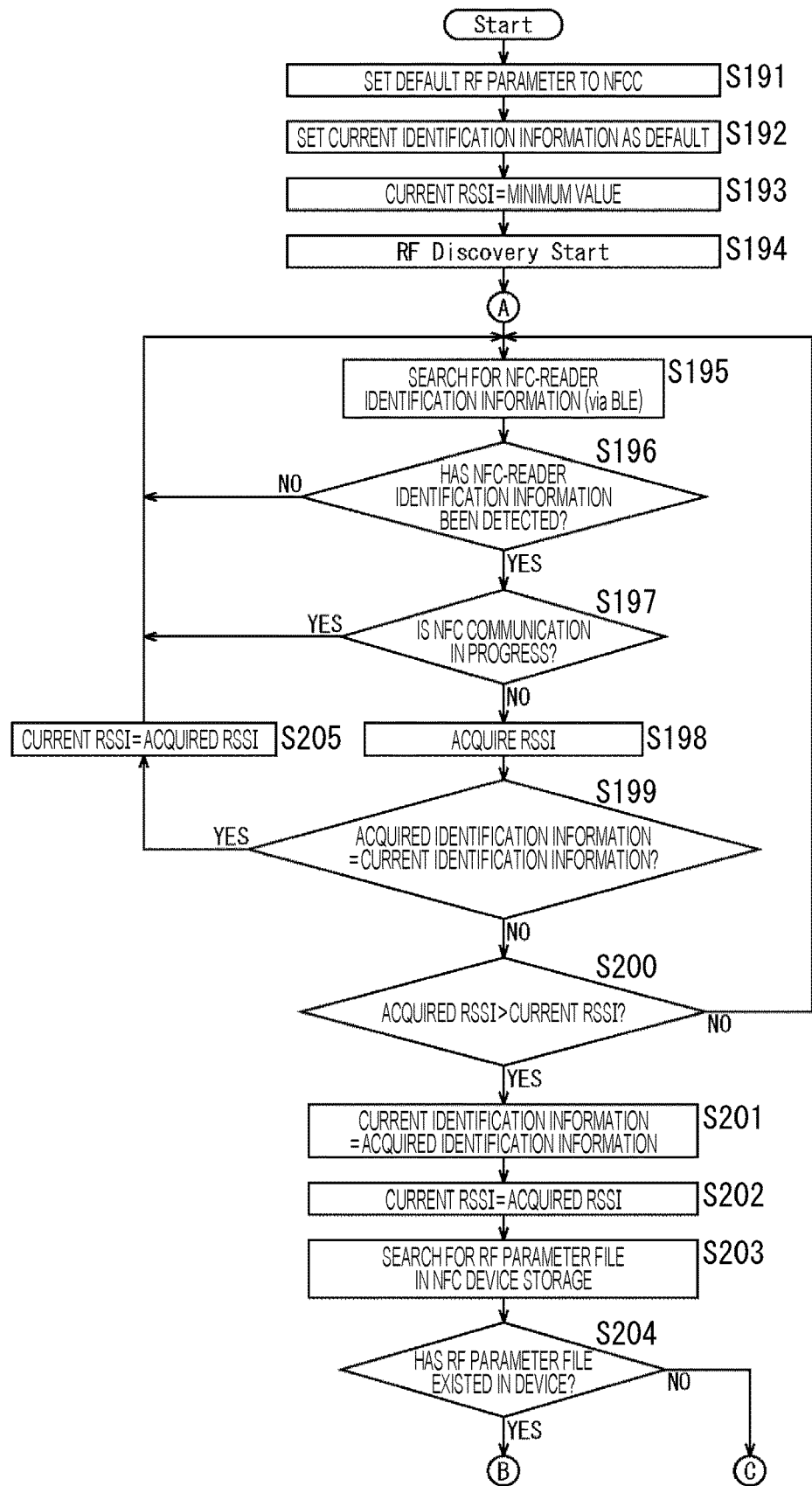
FIG. 24 is a flowchart for describing RF-parameter setting processing on the basis of the plurality of pieces of NFC-reader identification information.
Figure 25:
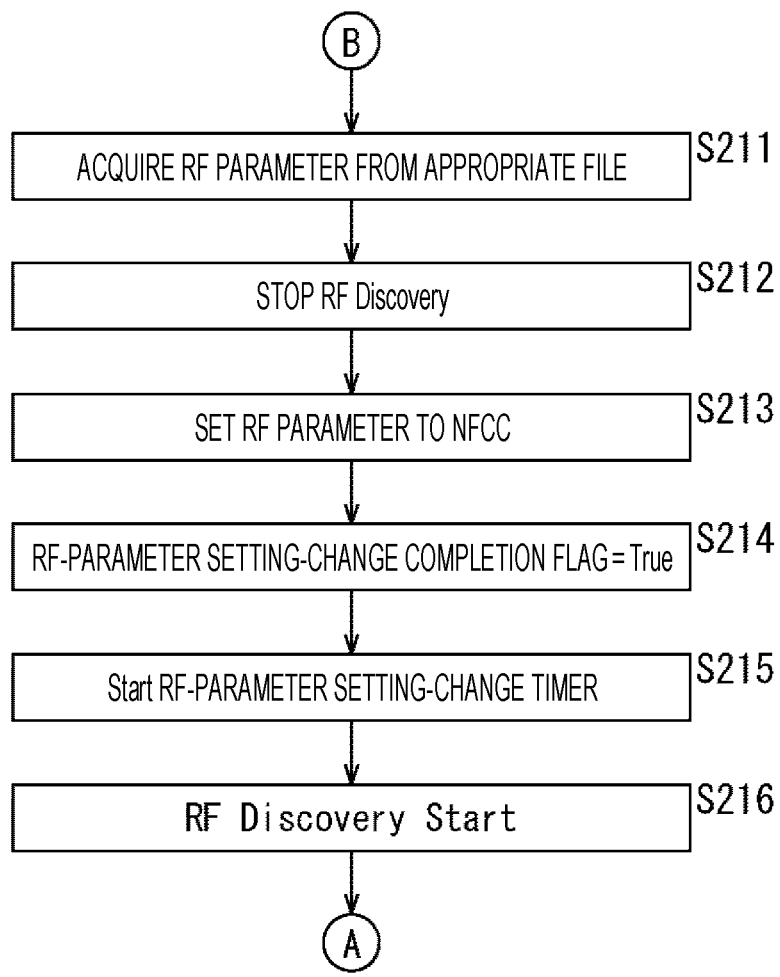
FIG. 25 is a flowchart for describing the RF-parameter setting processing on the basis of the plurality of pieces of NFC-reader identification information.
Figure 26:
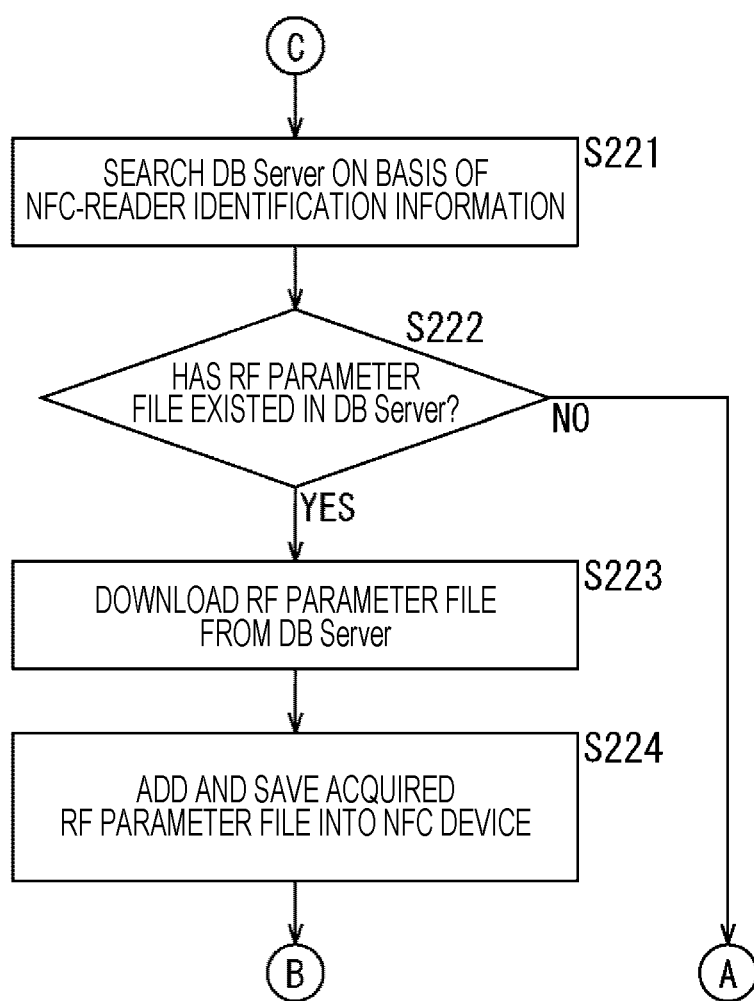
FIG. 26 is a flowchart for describing the RF-parameter setting processing on the basis of the plurality of pieces of NFC-reader identification information.

Next, FIGS. 24 to 26 are flowcharts for describing the second operation in which in a case where the NFC device 20 has simultaneously acquired the plurality of pieces of NFC-reader information from the plurality of different NFC readers 10, the NFC device selects an NFC reader with the highest RSSI (signal strength) of BLE and sets the RF parameter to allow correspondence to the selected NFC reader 10.

In step S191, the DH 25 sets the RF parameter to the NFCC 21 on the basis of the default RF parameter file held in the memory unit 27. In step S192, the DH 25 sets the current identification information by default. In step S193, the DH 25 sets current RSSI at the minimum value. In step S194, the NFCC 21 starts the RF Discovery for seeking a party of NFC communication in accordance with control from the DH 25.

Next, in step S195, the BLE communication unit 26 verifies the BLE advertisement packet to start searching for the NFC-reader identification information notified from the NFC reader 10. In step S196, it is determined that whether or not the NFC-reader identification information has been detected successfully. Here, in a case where the NFC-reader identification information has been non-detected, the processing returns to step S195.

In a case where the NFC-reader identification information has been detected successfully in step S196, the successfully-detected NFC-reader identification information is acquired, and then the processing proceeds to step S197. In step S197, the DH 25 determines whether or not NFC communication is currently in progress. Here, in a case where it is determined that the NFC communication is in progress, the processing returns to step S195.

In step S197, in a case where it is determined that the NFC communication is not in progress, the processing proceeds to step S198. In step S198, the DH 25 acquires, from the BLE communication unit 26, the RSSI at the acquisition of the NFC-reader identification information.

In step S199, the DH 25 determines whether or not the successfully-acquired NFC-reader identification information and the current identification information are identical to each other. Here, in a case where it is determined that the successfully-acquired NFC-reader identification information and the current identification information are identical, the NFC device 20 has already been compatible with the NFC reader 10 corresponding to the successfully-acquired NFC-reader identification information, so that the processing proceeds to step S205. In step S205, the DH 25 updates the current RSSI using the RSSI acquired in step S198. Thereafter, the processing returns to step S195.

In step S199, in a case where it is determined that the successfully-acquired NFC-reader identification information and the current identification information are different from each other, the processing proceeds to step S200. In step S200, the DH 25 determines whether or not the acquired RSSI is higher than the current RSSI. Here, in a case where it is determined that the acquired RSSI is not higher than the current RSSI, the processing returns to step S195.

In step S200, in a case where it is determined that the acquired RSSI is higher than the current RSSI, the processing proceeds to step S201. In step S201, the NFCC 21 updates the current identification information to the successfully-acquired NFC-reader identification information. In step S202, the DH 25 updates the current RSSI using the RSSI acquired in step S199.

Next, in step S203, the DH 25 starts, in the memory unit 27, seeking an RF parameter file corresponding to the successfully-acquired NFC-reader identification information (current identification information). In step S204, the DH 25 determines whether or not the RF parameter file corresponding to the successfully-acquired NFC-reader identification information has been held in the memory unit 27. Here, in a case where it is determined that the corresponding RF parameter file has been held in the memory unit 27, the processing proceeds to step S211 in FIG. 25.

In step S211, the DH 25 acquires the RF parameter file from the memory unit 27. In step S212, the NFCC 21 stops the RF Discovery in accordance with control from the DH 25. Thereafter, in step S213, the DH 25 sets, to the NFCC 21, the RF parameter described in the RF parameter file acquired from the memory unit 27. Moreover, in step S214, the DH 25 sets the RF-parameter setting-change completion flag to True, and in step S215, starts clocking with the RF-parameter setting-change timer.

Next, in step S216, the NFCC 21 restarts the stopped RF Discovery, in accordance with control from the DH 25. At this stage, the RF parameter corresponding to the NFC reader 10 having higher RSSI strength is set to the NFCC 21, so that NFC communication can be made with high accuracy. Thereafter, the processing returns to step S195 in FIG. 24, and the subsequent steps are repeated.

On the other hand, in a case where it is determined in step S204 that the RF parameter file corresponding to the successfully-acquired NFC-reader identification information has not been held in the memory unit 27, the processing proceeds to step S221 in FIG. 26.

In step S221, the DH 25 makes connection to the DB server 40 via the communication network 31, and starts seeking the RF parameter file corresponding to the successfully-acquired NFC-reader identification information. In step S222, the DH 25 determines whether or not the RF parameter file has been accumulated in the DB server 40.

Here, in a case where it is determined that the RF parameter file has been accumulated in the DB server 40, the processing proceeds to step S223.

In step S223, the DH 25 downloads the RF parameter file from the DB server 40.

In step S224, the DH 25 causes the memory unit 27 to hold the RF parameter file downloaded from the DB server 40. Thereafter, the processing proceeds to step S211 in FIG. 25. In this case, the RF parameter is set to the NFCC 21 on the basis of the RF parameter file downloaded from the DB server 40.

On the other hand, in a case where it is determined in step S222 that the corresponding RF parameter file has not been accumulated in the DB server 40, the processing returns to step S195 in FIG. 24, and then the subsequent steps are repeated. In this case, the default RF parameter already set to the NFCC 21 is to be used in communication via NFC.

Figure 27:
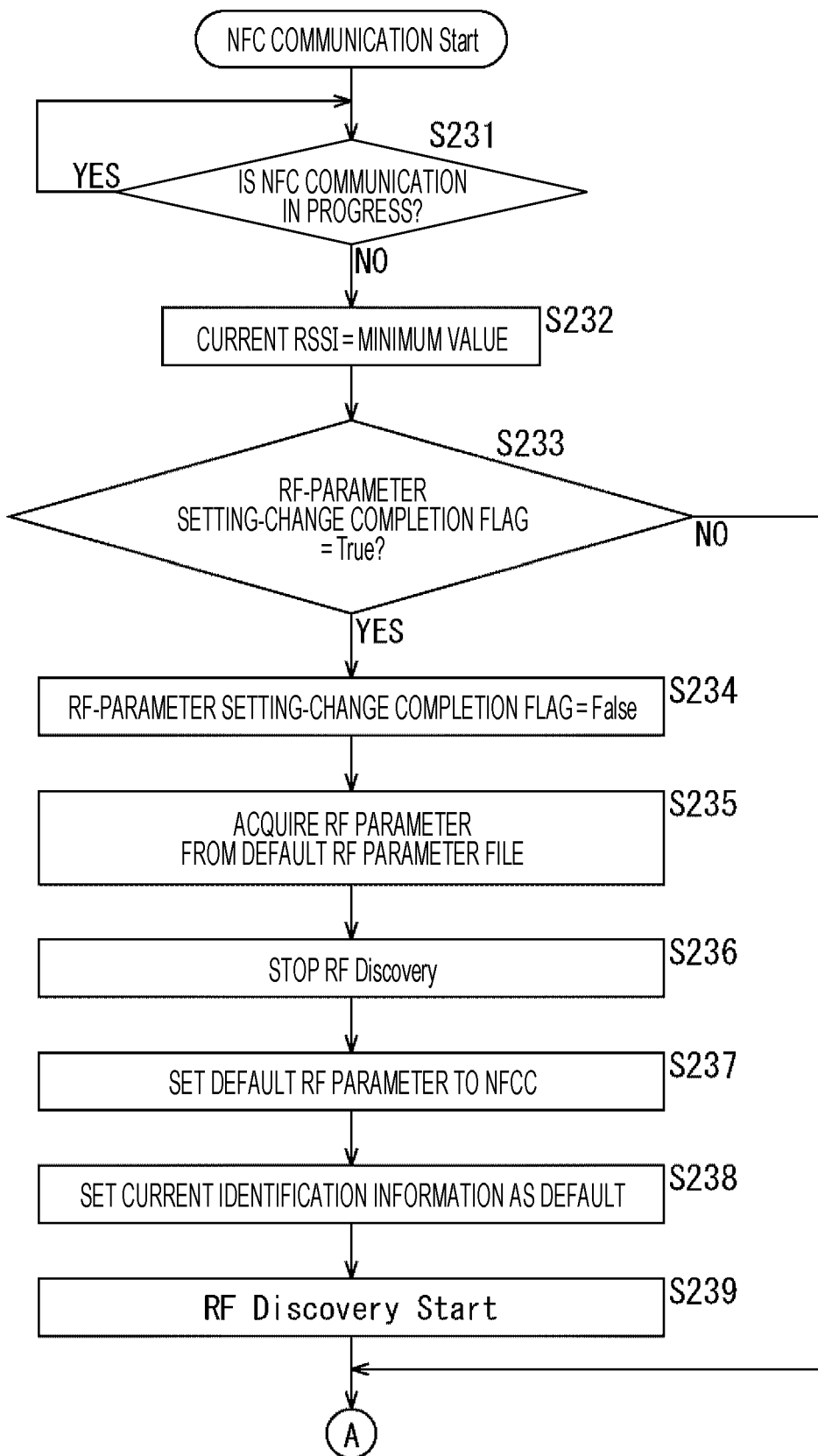
FIG. 27 is a flowchart for describing NFC communication after RF-parameter setting.

Next, FIG. 27 is a flowchart for describing processing when NFC communication has started by placement of the NFC device 20 over the NFC reader 10, after the start of the RF Discovery as the processing in, for example, step S194 described above.

In step S231, the DH 25 determines whether or not the NFC communication is in progress, and stands by until the NFC communication ends. In a case where the NFC communication has ended, the processing proceeds to step S232. In step S232, the DH 25 sets the current RSSI at the minimum value.

In step S233, the DH 25 verifies the RF-parameter setting-change flag and determines whether or not the RF-parameter setting-change flag is True. Here, in a case where it is determined that the RF-parameter setting-change flag is True, the processing proceeds to step S234, and then the setting of the RF parameter to the NFCC 21 is returned to the default.

In other words, in step S234, the DH 25 sets the RF-parameter setting-change flag to False. In step S235, the DH 25 acquires the default RF parameter file from the memory unit 27. In step S236, the NFCC 21 stops the RF Discovery in accordance with control from the DH 25. Thereafter, in step S237, the DH 25 sets, to the NFCC 21, the RF parameter described in the default RF parameter file acquired from the memory unit 27.

In step S238, the DH 25 sets the current identification information by default. In step S239, the NFCC 21 restarts the RF Discovery for seeking a party of NFC communication in accordance with control from the DH 25. Thereafter, the processing returns to step S195 in FIG. 24, and the subsequent steps are repeated.

On the other hand, in a case where it is determined in step S233 that the RF-parameter setting-change flag is not True, due to the default RF-parameter setting to the NFCC 21, steps S234 to S239 are skipped, and the processing returns to step S195 in FIG. 14, and then the subsequent steps are repeated.

Figure 28:
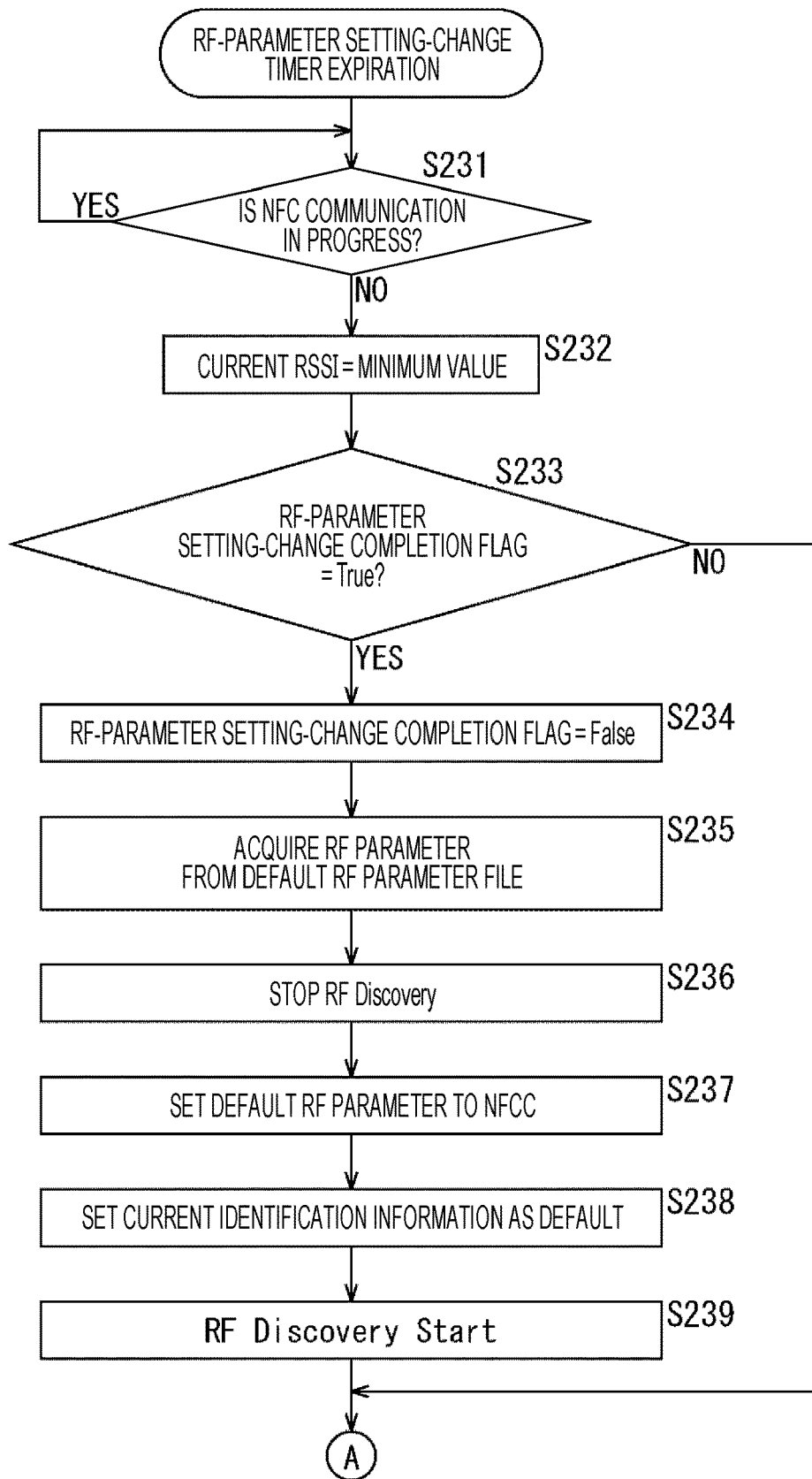
FIG. 28 is a flowchart for describing processing at the expiration of the timer after change of the RF-parameter setting.

Next, FIG. 28 is a flowchart for describing processing when the RF-parameter setting-change timer after staring clocking as the processing in step S215 described above has measured time exceeding a predetermined expiration time.

Note that this processing is substantially the same as the processing described with reference to FIG. 27; thus, the same step numbers (S231 to S239) are given and the description thereof is omitted.

As described above, the second operation in the case of the acquisition of the plurality of pieces of NFC-reader identification information prior to the NFC communication enables the setting of the RF parameter corresponding to the NFC reader 10 having the higher RSSI, to the NFCC 21.

Note that also in a case where the plurality of pieces of CL-service identification information has been acquired prior to the NFC communication, the protocol parameter corresponding to the NFC reader 10 having the higher RSSI may be settable to the NFCC 21 in a similar manner.

8. USE CASE OF NFC SYSTEM

<8-1. First Use Case of NFC System>

Figure 29:
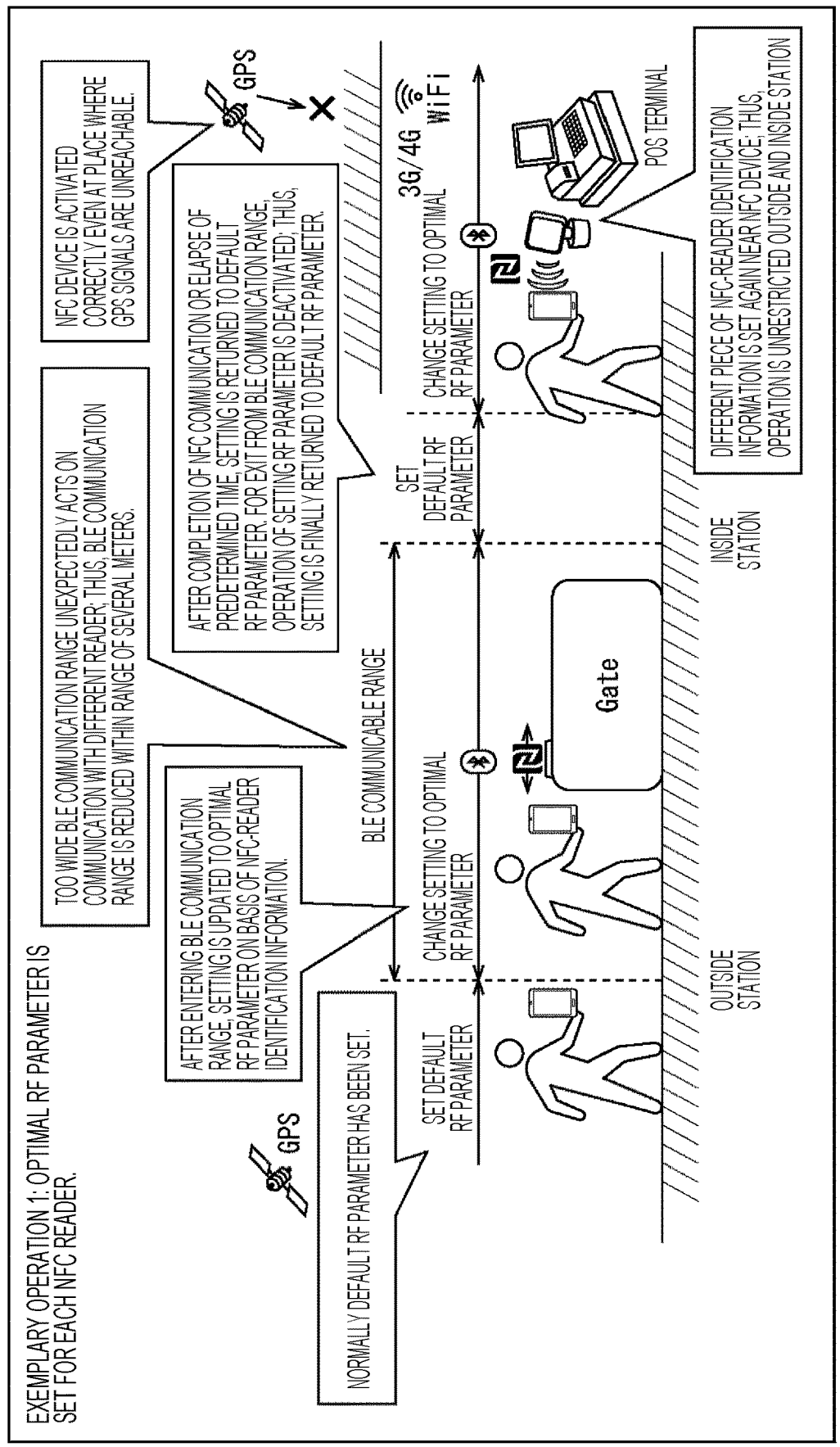
FIG. 29 is an explanatory illustration of a first use case of the NFC communication system.

Next, FIG. 29 an explanatory illustration of a first use case of the NFC system. In the first use case, it is assumed that NFC readers 10 are installed at a ticket gate of a station and a store in the station, respectively.

In a case where the user possessing an NFC device 20 is outside the station or the like where no NFC reader 10 exists, the default RF parameter has been set to the NFCC 21 of the NFC device 20.

When the user enters the BLE communicable range of the NFC reader 10 installed in the ticket gate, the NFC device 20 is notified of a piece of NFC-reader identification information from the NFC reader 10, and an RF parameter optimal for the NFC reader 10 of the station gate is set to the NFCC 21 of the NFC device 20. Thus, the NFC device 20 can reliably make NFC communication with the NFC reader 10 of the ticket gate, so that the user can pass through the ticket gate quickly.

After end of the NFC communication with the NFC reader 10 of the ticket gate, the default RF parameter is set to the NFCC 21 of the NFC device 20. Note that, also in case where a predetermined time has elapsed after the setting of the RF parameter optimal for the NFC reader 10 of the ticket gate, the default RF parameter is set to the NFCC 21 of the NFC device 20.

Next, when the user enters the BLE communicable range of the NFC reader 10 installed at the store in the station, the NFC device 20 is notified of a piece of NFC-reader identification information from the NFC reader 10, and an RF parameter optimal for the NFC reader 10 of the store is set to the NFCC 21 of the NFC device 20. Thus, the NFC device 20 can reliably make NFC communication with the NFC reader 10 of the store, so that the user can quickly shop (pay electrically) at the store.

<8-2. Second Use Case of NFC System>

Figure 30:
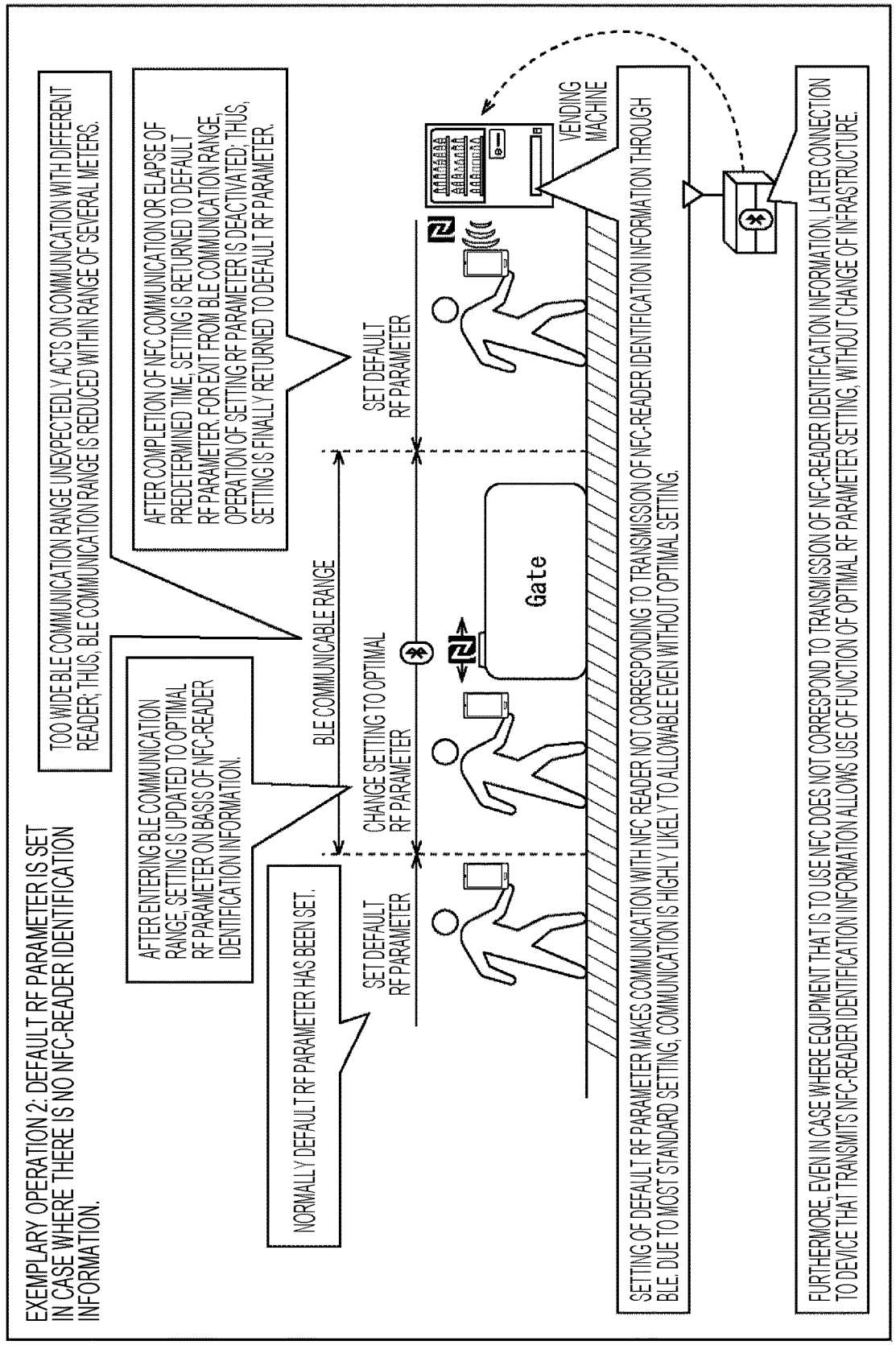
FIG. 30 is an explanatory illustration of a second use case of the NFC communication system.

Next, FIG. 30 is an explanatory illustration of a second use case of the NFC system. In the second use case, it is assumed that an NFC reader 10 is installed at a ticket gate of a station, and a vending machine in the station has a conventional NFC reader 12 installed, the conventional NFC reader 12 not including an identification-information output unit 11.

In a case where the user possessing an NFC device 20 is outside the station or the like where no NFC reader 10 exists, the default RF parameter has been set to the NFCC 21 of the NFC device 20.

When the user enters the BLE communicable range of the NFC reader 10 installed in the ticket gate, the NFC device 20 is notified of a piece of NFC-reader identification information from the NFC reader 10, and an RF parameter optimal for the NFC reader 10 of the station gate is set to the NFCC 21 of the NFC device 20. Thus, the NFC device 20 can reliably make NFC communication with the NFC reader 10 of the ticket gate, so that the user can pass through the ticket gate quickly.

After end of the NFC communication with the NFC reader 10 of the ticket gate, the default RF parameter is set to the NFCC 21 of the NFC device 20. Note that, also in case where a predetermined time has elapsed after the setting of the RF parameter optimal for the NFC reader 10 of the ticket gate, the default RF parameter is set to the NFCC 21 of the NFC device 20.

Thereafter, in a case where the user attempts to use the vending machine in the station, due to the default RF-parameter setting to the NFCC 21 of the NFC device 20, it is highly likely that electric payment can be made with the NFC reader 12 of the vending machine, via NFC communication.

Note that an identification-information output device 13 as illustrated in FIG. 2 may be added to the conventional NFC reader 12 installed in this vending machine. In that case, the NFC device 20 of the user can reliably make NFC communication with the NFC reader 12 of the vending machine, so that the user can quickly shop (pay electrically) with the vending machine.

<8-3. Third Use Case of NFC System>

Figure 31:
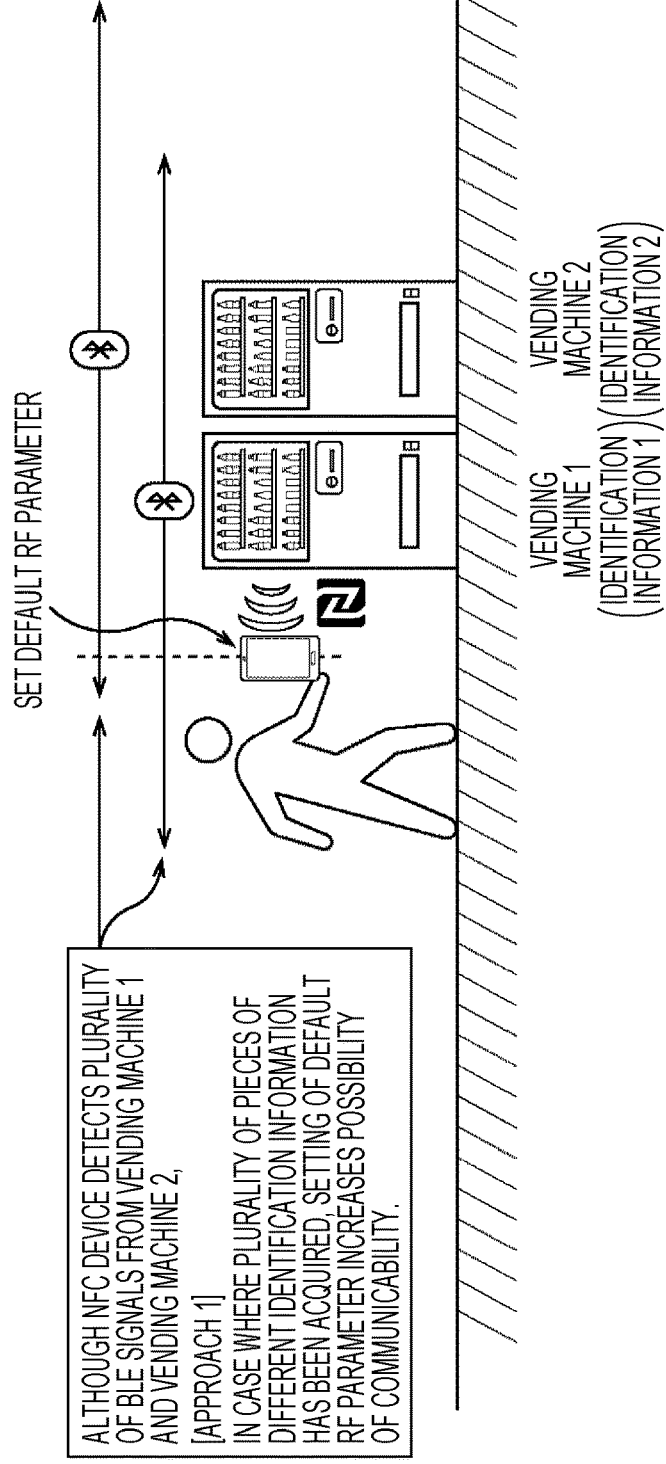
FIG. 31 is an explanatory illustration of a third use case of the NFC communication system.

Next, FIG. 31 an explanatory illustration of a third use case of the NFC system. In the third use case, it is assumed that NFC readers 10 are respectively installed in a plurality of vending machines arranged adjacently. Furthermore, it is assumed that an NFC device 20 of the user performs the first operation described above with reference to FIGS. 18 to 21.

In a case where the user possessing the NFC device 20 has entered the BLE communicable range of the NFC reader 10 installed in each of two vending machines, the default RF parameter is set to the NFCC 21 of the NFC device 20. The possibility that electric payment can be made with each of the two vending machines, via NFC communication, can be increased.

<8-4. Fourth Use Case of NFC System>

Figure 32:
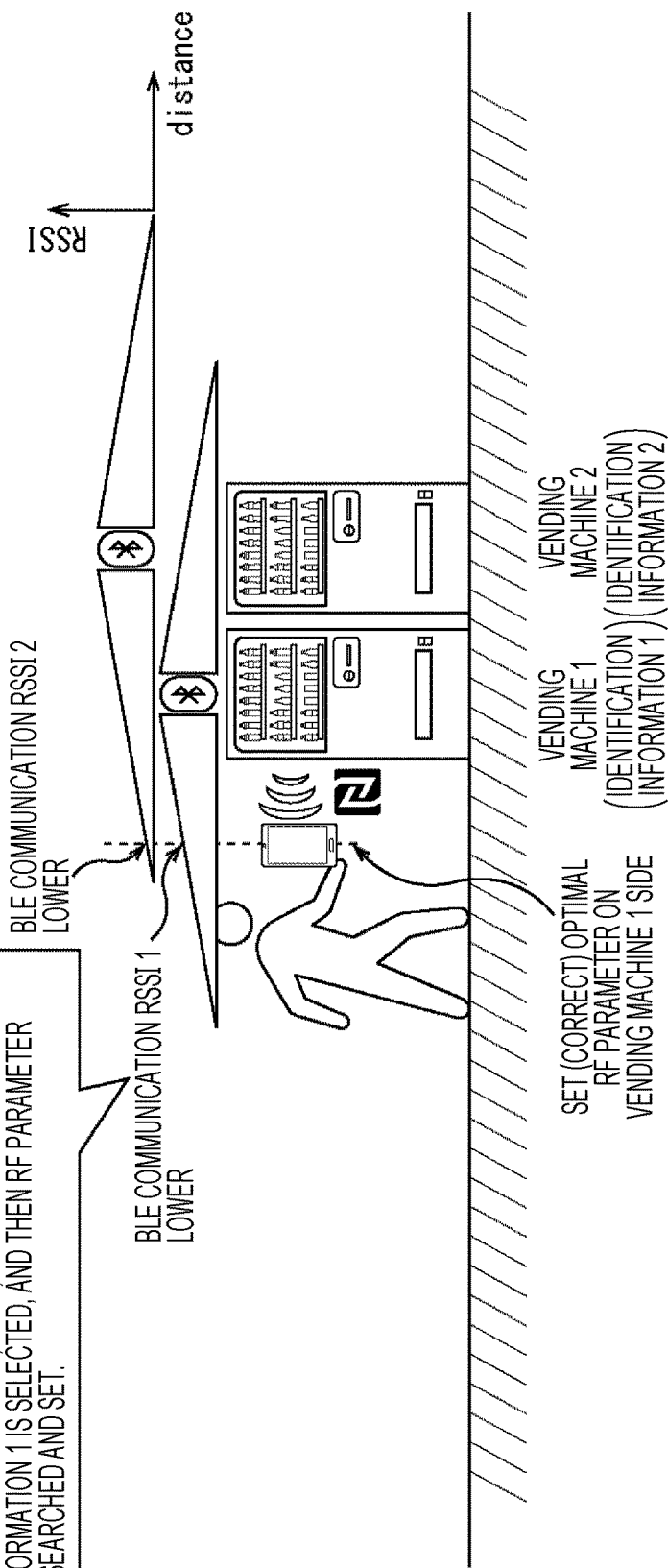
FIG. 32 is an explanatory illustration of a fourth use case of the NFC communication system.

Next, FIG. 32 is an explanatory illustration of a fourth use case of the NFC system. In the fourth use case, it is assumed that NFC reader 10 is respectively installed in a plurality of vending machines arranged adjacently. Furthermore, it is assumed that a NFC device 20 of the user performs the second operation described above with reference to FIGS. 24 to 26.

In a case where the user possessing an NFC device 20 has entered the BLE communicable range of the NFC reader 10 installed in each of two vending machines, an RF parameter corresponding the NFC reader 10 having higher RSSI is set to the NFCC 21 of the NFC device 20. In the case of the same figure, a vending machine 1 has higher RSSI. Thus, an RF parameter corresponding to the NFC reader 10 installed in the vending machine 1 is set to the NFCC 21 of the NFC device 20. As a result, the NFC device 20 can quickly pay electrically with the vending machine 1 via NFC communication.

<8-5. Fifth Use Case of NFC System>

Figure 33:
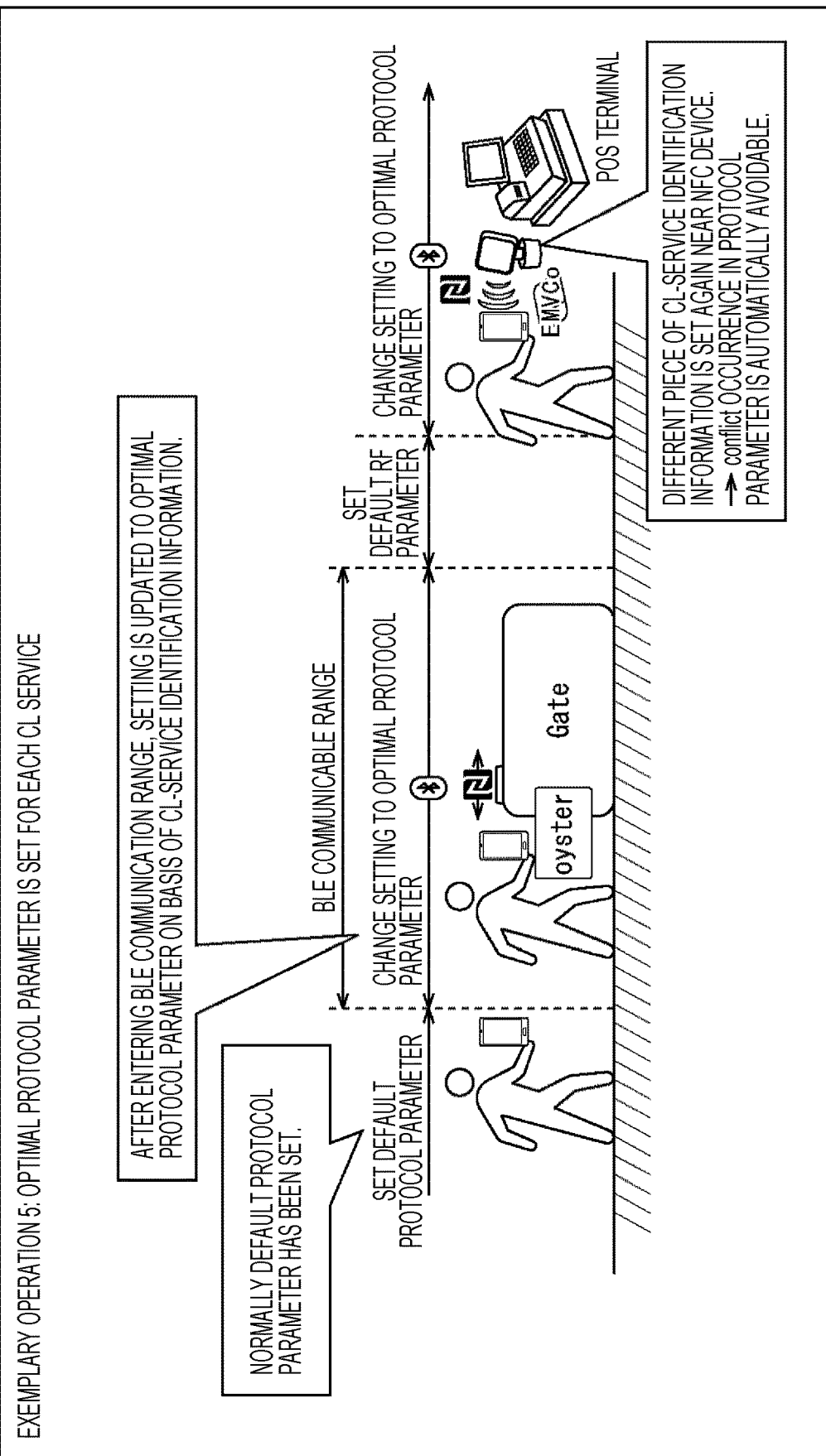
FIG. 33 is an explanatory illustration of a fifth use case of the NFC communication system.
Figure 34:
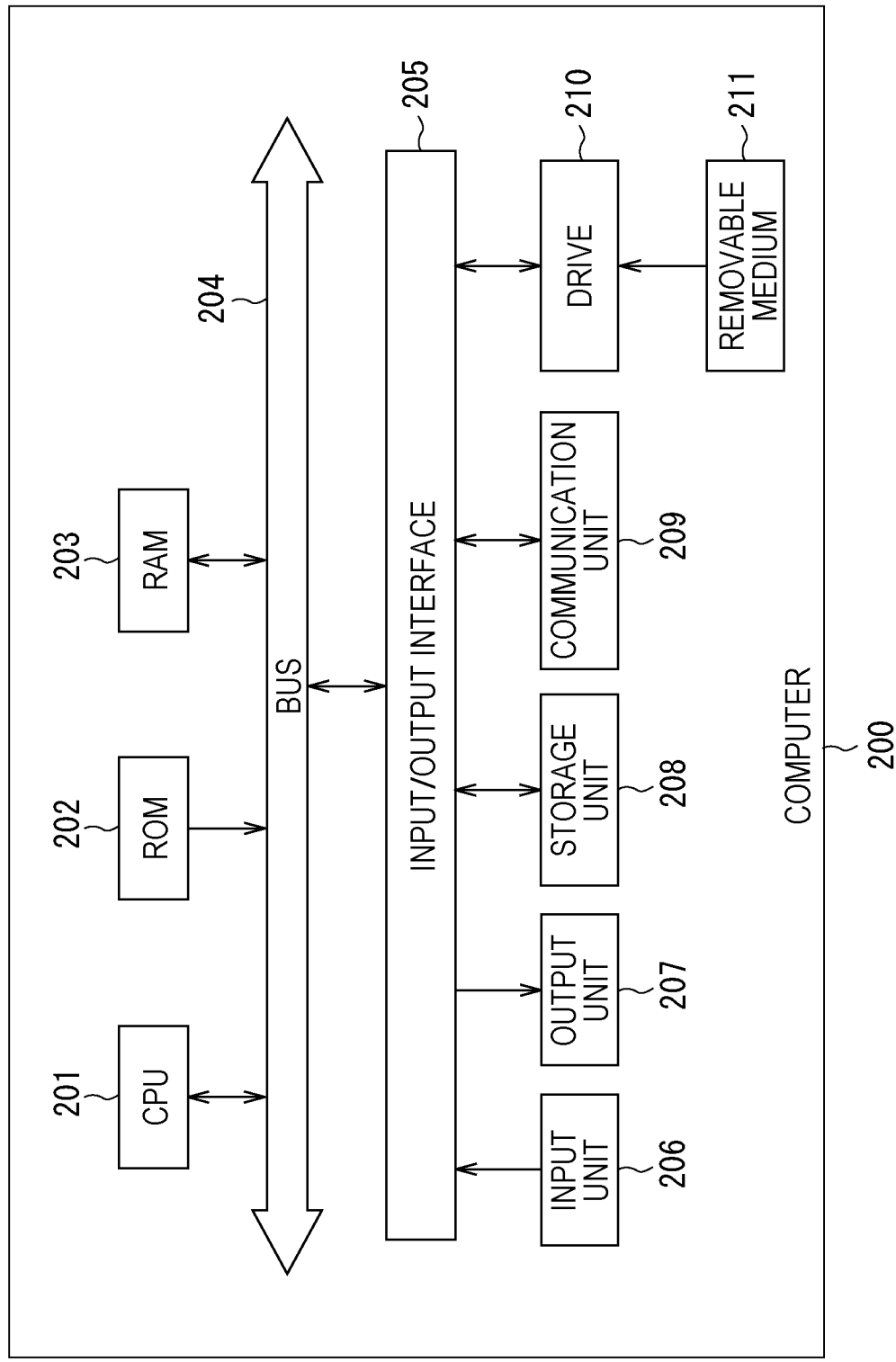
FIG. 34 is a block diagram of an exemplary configuration of a computer.

Next, FIG. 33 is an explanatory illustration of a fifth use case of the NFC system. In the fifth use case, it is assumed that NFC readers 10 are installed at a ticket gate of a station and a store in the station, respectively.

In a case where the user possessing an NFC device 20 is outside the station or the like where no NFC reader 10 exists, the default protocol parameter has been set to the NFCC 21 of the NFC device 20.

When the user enters the BLE communicable range of the NFC reader 10 installed in the ticket gate, the NFC device 20 is notified of a piece of CL-service identification information from the NFC reader 10, and a protocol parameter optimal for a CL service adopted for the ticket gate is set to the NFCC 21 of the NFC device 20. Thus, the NFC device 20 can reliably make NFC communication with the NFC reader 10 of the ticket gate, so that the user can pass through the ticket gate quickly.

After end of the NFC communication with the NFC reader 10 of the ticket gate, the default protocol parameter is set to the NFCC 21 of the NFC device 20. Note that, also in a case where a predetermined time has elapsed after the setting of the protocol parameter optimal for the NFC reader 10 of the ticket gate, the default protocol parameter is set to the NFCC 21 of the NFC device 20.

Next, when the user enters the BLE communicable range of the NFC reader 10 installed at the store in the station, the NFC device 20 is notified of a piece of CL-service identification information from the NFC reader 10, and a protocol parameter optimal for a CL service adopted for the store is set to the NFCC 21 of the NFC device 20. Thus, the NFC device 20 can reliably make NFC communication with the NFC reader 10 of the store, so that the user can quickly shop (pay electrically) at the store.

9. CONCLUSION

As described above, the NFC system according to the present embodiment facilitates, prior to the NFC communication, the setting of the RF parameter and protocol parameter of the NFC device 20, in accordance with the model of or the CL service adopted for the NFC reader 10 to be a communication party. Thus, NFC communication can be made speedily with high accuracy.

Furthermore, for the NFC system according to the present embodiment, the RF parameter file is generated for each model of the NFC reader 10, which enables giving a large margin to the individual parameter setting. As a result, RF communication performance can be increased and interconnectivity can be improved.

Even in a case where a new NFC reader 10 or CL service appears after release of the NFC device 20, addition of an RF parameter file or protocol parameter file corresponding to the new NFC reader 10 or CL service to the DB server 40 enables the released NFC device 20 to be compatible with the new NFC reader 10 or CL service.

The amount of data of the RF parameter file and the protocol parameter file each recorded in the memory unit 27 of the NFC device 20 and the DB server 40 is small, so that search and download can be performed quickly.

The present embodiment has no influence on NFC communication at all, so that existing NFC devices and NFC readers can enjoy existing services.

Note that, according to the present embodiment, prior to the NFC communication, the NFC reader 10 notifies the NFC device 20 of the identification information (NFC-reader identification information or CL-service identification information), and then setting is changed such that the NFC device 20 is compatible with the NFC reader 10. On the contrary, the present technology is applicable even in a case where prior to the NFC communication, the NFC device 20 notifies the NFC reader 10 of the identification information and then setting is changed such that the NFC reader 10 is compatible with the NFC device 20.

10. EXECUTION OF SERIES OF PROCESSING WITH SOFTWARE

Meanwhile, the series of processing described above can be performed with hardware or software. For performance of the series of processing with software, a program included in the software is installed in a computer. Here, examples of the computer include, a computer embedded in dedicated hardware, and a general-purpose personal computer executable for various functions by installation of various programs.

FIG. 12 is a block diagram of an exemplary hardware configuration of a computer that performs the series of processing described above, in accordance with a program.

In a computer 200, a central processing unit (CPU) 201, a read only memory (ROM) 202, and a random access memory (RAM) 203 are mutually connected via a bus 204.

Moreover, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, an imaging element, and the like. The output unit 207 includes a display, a speaker, and the like. The storage unit 208 includes a hard disk, a non-volatile memory, or the like. The communication unit 209 includes, for example, a network interface. The drive 210 drives a removable medium 211 such as a magnetic disk, an optical disk, a magneto-optical disk, or a semiconductor memory.

For the computer having the configuration described above, the CPU 201 loads, for example, a program stored in the storage unit 208 into the RAM 203 via the input/output interface 205 and the bus 204, and executes the program, whereby the series of processing described above is performed.

The program executed by the computer (CPU 201) can be provided by being recorded on, for example, the removable medium 211 as a package medium or the like. Furthermore, the program can be provided via a wired or wireless transmission medium such as a local area network, the Internet, or digital satellite broadcasting.

In the computer, the program can be installed in the storage unit 208 via the input/output interface 205 by attachment of the removable medium 211 to the drive 210. Furthermore, the program can be received by the communication unit 209 via a wired or wireless transmission medium and installed in the storage unit 208. Besides, the program can be preinstalled in the ROM 202 or the storage unit 208.

Note that the program executed by the computer may be a program for performing processing chronologically according to the order described in the present specification, may be a program for performing parallel processing, or may be a program for performing processing at a required timing, for example, when a call is made.

Note that the effects described in the present specification are merely exemplified and are not intended to be limiting, and may have additional effects.

The embodiment of the present technology is not limited to the above described embodiment, and various modifications can be made without departing from the gist of the present technology.

The present technology can also have configurations below.

(1)

A communication apparatus including:

a first short-range wireless communication unit configured to communicate with a communication party, via first short-range wireless communication;

an acquisition unit configured to acquire, prior to the communication via the first short-range wireless communication, identification information notified from the communication party, via second short-range wireless communication wider in communicable range than the first short-range wireless communication; and a control unit configured to control the first short-range wireless communication unit and the acquisition unit, in which the control unit acquires a parameter file corresponding to the identification information having been acquired, and sets, on the basis of the parameter file, a parameter for the first short-range wireless communication to the first short-range wireless communication unit.

(2)

The communication apparatus according to (1) described above, further including:

a holding unit configured to hold the parameter file, in which the control unit acquires the parameter file from the holding unit.

(3)

The communication apparatus according to (2) described above, in which in a case where the parameter file corresponding to the identification information having been acquired is not held in the holding unit, the control unit acquires, from a data base server, the parameter file corresponding to the identification information having been acquired.

(4)

The communication apparatus according to (3) described above, in which the control unit causes the holding unit to hold the parameter file acquired from the data base server.

(5)

The communication apparatus according to any of (1) to (4) described above, in which the identification information indicates at least one of a model of the communication party or a contactless (CL) service adopted for the communication party.

(6)

The communication apparatus according to (5) described above, in which the holding unit has held, at delivery, a RF parameter file corresponding to the model of the communication party existing in a country or an area where the communication apparatus is to be released.

(7)

The communication apparatus according to (5) described above, in which the holding unit has held, at delivery, a protocol parameter file corresponding to the CL service existing in a country or an area where the communication apparatus is to be released.

(8)

The communication apparatus according to any of (2) to (7) described above, in which the holding unit has further held a default parameter file, at the delivery.

(9)

The communication apparatus according to (8) described above, in which in a case where the acquisition unit acquires a plurality of pieces of the identification information, the control unit acquires the default parameter file from the memory unit, and sets, on the basis of the default parameter file, the parameter for the first short-range wireless communication to the first short-range wireless communication unit.

(10)

The communication apparatus according to any of (1) to (8) described above, in which in a case where a plurality of pieces of the identification information is acquired, the control unit acquires the parameter file corresponding to a piece of the identification information higher in signal strength at the acquisition, and sets, on the basis of the parameter file, the parameter for the first short-range wireless communication to the first short-range wireless communication unit.

(11)

A communication method with a communication apparatus including a first short-range wireless communication unit configured to communicate with a communication party, via first short-range wireless communication, the communication method, by the communication apparatus, including:

a step of acquiring, prior to the communication via the first short-range wireless communication, identification information notified from the communication party, via second short-range wireless communication wider in communicable range than the first short-range wireless communication; and a step of acquiring a parameter file corresponding to the identification information having been acquired, and setting, on the basis of the parameter file, a parameter for the first short-range wireless communication to the first short-range wireless communication unit.

(12)

A program for causing a computer to function as:

a first short-range wireless communication unit configured to communicate with a communication party, via first short-range wireless communication;

an acquisition unit configured to acquire, prior to the communication via the first short-range wireless communication, identification information notified from the communication party, via second short-range wireless communication wider in communicable range than the first short-range wireless communication; and a control unit configured to control the first short-range wireless communication unit and the acquisition unit, in which the control unit acquires a parameter file corresponding to the identification information having been acquired, and sets, on the basis of the parameter file, a parameter for the first short-range wireless communication to the first short-range wireless communication unit.

(13)

A communication apparatus including:

a first short-range wireless communication unit configured to communicate with a communication party, via first short-range wireless communication; and a notification unit configured to notify, prior to the communication via the first short-range wireless communication, the communication party of identification information via second short-range wireless communication wider in communicable range than the first short-range wireless communication.

(14)

The communication apparatus according to (13) described above, in which the notification unit notifies the identification information indicating at least one of a model of the communication apparatus or a contactless (CL) service adopted for the communication apparatus.

(15)

A communication method with a communication apparatus including a first short-range wireless communication unit configured to communicate with a communication party, via first short-range wireless communication, the communication method, by the communication apparatus, including:

a step of notifying, prior to the communication via the first short-range wireless communication, the communication party of identification information via second short-range wireless communication wider in communicable range than the first short-range wireless communication.

(16)

A program for causing a computer to function as:

a first short-range wireless communication unit configured to communicate with a communication party, via first short-range wireless communication; and a notification unit configured to notify, prior to the communication via the first short-range wireless communication, the communication party of identification information via second short-range wireless communication wider in communicable range than the first short-range wireless communication.

REFERENCE SIGNS LIST

10 NFC reader
11 Identification-information output unit
12 NFC reader
13 Identification-information output device
20 NFC device
21 NFCC
22 Antenna
23 eSE
24 UICC
25 DH
26 BLE communication unit
27 Memory unit
31 Communication network
40 DB server
200 Computer
201 CPU

The invention claimed is:

1. A communication apparatus comprising:
a first short-range wireless communication unit configured to communicate with a communication party, via first short-range wireless communication;
an acquisition unit configured to acquire, prior to the communication via the first short-range wireless communication and while the communication via the first short-range wireless communication is not established, identification information notified from the communication party, via second short-range wireless communication wider in communicable range than the first short-range wireless communication; and
a control unit configured to acquire a parameter file corresponding to the acquired identification information, and set, on a basis of the parameter file, a parameter for the first short-range wireless communication,
wherein the first short-range wireless communication unit, the acquisition unit, and the control unit are each implemented via at least one processor.

2. The communication apparatus according to claim 1, further comprising:
a holding unit configured to hold the parameter file,
wherein the control unit acquires the parameter file from the holding unit, and
wherein the holding unit is implemented via at least one processor.

3. The communication apparatus according to claim 2, wherein in a case where the parameter file corresponding to the acquired identification information is not held in the holding unit, the control unit acquires, from a data base server, the parameter file corresponding to the acquired identification information.

4. The communication apparatus according to claim 3, wherein the control unit causes the holding unit to hold the parameter file acquired from the data base server.

5. The communication apparatus according to claim 2, wherein the identification information indicates at least one of a model of the communication party or a contactless (CL) service adopted for the communication party.

6. The communication apparatus according to claim 5, wherein the holding unit has held, at delivery, an RF parameter file corresponding to the model of the communication party existing in a country or an area where the communication apparatus is to be released.

7. The communication apparatus according to claim 5, wherein the holding unit has held, at delivery, a protocol parameter file corresponding to the CL service existing in a country or an area where the communication apparatus is to be released.

8. The communication apparatus according to claim 6, wherein the holding unit has further held a default parameter file, at the delivery.

9. The communication apparatus according to claim 8, wherein in a case where the acquisition unit acquires a plurality of pieces of the identification information, the control unit acquires the default parameter file from the holding unit, and sets, on a basis of the default parameter file, the parameter for the first short-range wireless communication to the first short-range wireless communication unit.

10. The communication apparatus according to claim 2, wherein in a case where a plurality of pieces of the identification information is acquired, the control unit acquires the parameter file corresponding to a piece of the identification information higher in signal strength at the acquisition, and sets, on a basis of the parameter file, the parameter for the first short-range wireless communication to the first short-range wireless communication unit.

11. A communication method with a communication apparatus including a first short-range wireless communication unit configured to communicate with a communication party, via first short-range wireless communication, the communication method, by the communication apparatus, comprising:

acquiring, prior to the communication via the first short-range wireless communication and while the communication via the first short-range wireless communication is not established, identification information notified from the communication party, via second short-range wireless communication wider in communicable range than the first short-range wireless communication;

acquiring a parameter file corresponding to the acquired identification information; and setting, on a basis of the parameter file, a parameter for the first short-range wireless communication.

12. A non-transitory computer-readable medium having embodied thereon a program, which when executed by a computer causes the computer to execute a method, the method comprising:
- communicating with a communication party, via first short-range wireless communication;
- acquiring, prior to the communication via the first short-range wireless communication and while the communication via the first short-range wireless communication is not established, identification information notified from the communication party, via second short-range wireless communication wider in communicable range than the first short-range wireless communication; and
- acquiring a parameter file corresponding to the acquired identification information; and
- setting, on a basis of the parameter file, a parameter for the first short-range wireless communication.

13. A communication apparatus comprising:
- a first short-range wireless communication unit configured to communicate with a communication party, via first short-range wireless communication; and
- a notification unit configured to notify, prior to the communication via the first short-range wireless communication and while the communication via the first short-range wireless communication is not established, the communication party of identification information via second short-range wireless communication wider in communicable range than the first short-range wireless communication,
- wherein the first short-range wireless communication unit and the notification unit are each implemented via at least one processor.

14. The communication apparatus according to claim 13, wherein the notification unit notifies the identification information indicating at least one of a model of the communication apparatus or a contactless (CL) service adopted for the communication apparatus.

15. A communication method with a communication apparatus including a first short-range wireless communication unit configured to communicate with a communication party, via first short-range wireless communication, the communication method, by the communication apparatus, comprising:
- notifying, prior to the communication via the first short-range wireless communication and while the communication via the first short-range wireless communication is not established, the communication party of identification information via second short-range wireless communication wider in communicable range than the first short-range wireless communication.

16. A non-transitory computer-readable medium having embodied thereon a program, which when executed by a computer causes the computer to execute a method, the method comprising:
- communicating with a communication party, via first short-range wireless communication; and
- notifying, prior to the communication via the first short-range wireless communication and while the communication via the first short-range wireless communication is not established, the communication party of identification information via second short-range wireless communication wider in communicable range than the first short-range wireless communication.

* * * * *